US 6,590,369 B2

(12) United States Patent
Burstein et al.

(10) Patent No.: US 6,590,369 B2
(45) Date of Patent: *Jul. 8, 2003

(54) DIGITAL VOLTAGE REGULATOR USING CURRENT CONTROL

(75) Inventors: Andrew J. Burstein, Mountain View, CA (US); David B. Lidsky, Oakland, CA (US); Anthony Stratakos, Fremont, CA (US); Charlie Sullivan, Hanover, NH (US); William Clark, Fremont, CA (US)

(73) Assignee: Volterra Semiconductor Corporation, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/858,255

(22) Filed: May 15, 2001

(65) Prior Publication Data

US 2001/0038277 A1 Nov. 8, 2001

Related U.S. Application Data

(63) Continuation of application No. 09/183,448, filed on Oct. 30, 1998, now Pat. No. 6,268,716.

(51) Int. Cl.[7] .................................................. G05F 1/59
(52) U.S. Cl. ........................ 323/272; 323/283; 323/204; 323/285
(58) Field of Search ................................. 323/271, 272, 323/283, 284, 285

(56) References Cited

U.S. PATENT DOCUMENTS

| 3,383,584 A | | 5/1968 | Atherton ...................... 323/286 |
| 3,978,393 A | | 8/1976 | Wisner et al. ............... 323/272 |
| 4,034,232 A | | 7/1977 | La Venture .................. 307/32 |
| 4,357,572 A | * | 11/1982 | Andersen et al. ........... 323/286 |
| 4,546,421 A | | 10/1985 | Bello et al. .................... 363/21 |
| 4,580,089 A | | 4/1986 | Grunsh et al. ............... 323/287 |
| 4,716,267 A | | 12/1987 | Reynolds ..................... 219/113 |
| 4,761,725 A | * | 8/1988 | Henze ......................... 323/283 |
| 4,920,246 A | * | 4/1990 | Aoki ........................... 323/283 |
| 5,422,562 A | | 6/1995 | Mammano et al. ......... 323/282 |
| 5,475,296 A | * | 12/1995 | Vinsant et al. .............. 323/284 |
| 5,514,947 A | | 5/1996 | Berg ........................... 323/282 |
| 5,523,676 A | | 6/1996 | Bach et al. ............... 324/103 P |
| 5,552,694 A | | 9/1996 | Appeltans .................. 323/222 |

(List continued on next page.)

FOREIGN PATENT DOCUMENTS

| EP | 0547916 | * | 6/1993 | .......... H02M/3/335 |
| WO | 95/31033 | * | 11/1995 | .......... H02M/3/337 |

OTHER PUBLICATIONS

Severns et. al., "Modern DC/DC Switchmode Power Converter Circuits", Van Nostrand Reinhold Co., pp. 11–77, Dec. 1997.*
Dixon, "Average Current Mode Control of Switching Power Supplies", Unitrode Corporation Design Seminar Manual, pp. C1–1 to C1–14, Dec. 1991.*
Dixon, "Switching Power Supply Topology Review", Unitrode Switching Regulator Design Seminar Manual, pp. P1–1 to P–1–11, Dec. 1991.*
Kassakian et al., "DC/DC Converters," *Principles of Power Electronics,* Adison–Wesley Publishing Co., Dec. 1991, Sec. 2.3, pp. 20–23.

(List continued on next page.)

*Primary Examiner*—Jeffrey Sterrett
(74) *Attorney, Agent, or Firm*—Fish & Richardson P.C.

(57) ABSTRACT

A digitally implemented voltage regulator in which a switching circuit intermittently couples the input terminal and the output terminal in response to a digital control signal. A current sensor generates a digital first feedback signal derived from the current passing through the switching circuit, and a voltage sensor generates a digital second feedback signal derived from the output voltage. A digital controller receives and uses the digital feedback signals to generate the digital control signal.

15 Claims, 17 Drawing Sheets

U.S. PATENT DOCUMENTS

| | | | | |
|---|---|---|---|---|
| 5,552,695 A | * | 9/1996 | Schwartz | 323/272 |
| 5,568,044 A | * | 10/1996 | Bittner | 323/272 |
| 5,578,916 A | | 11/1996 | Muterspaugh | 323/267 |
| 5,646,513 A | | 7/1997 | Riggio, Jr. | 323/285 |
| 5,672,958 A | * | 9/1997 | Brown et al. | 323/272 |
| 5,675,240 A | * | 10/1997 | Fujisawa | 323/282 |
| 5,677,619 A | | 10/1997 | Doluca | 323/282 |
| 5,731,694 A | * | 3/1998 | Wilcox et al. | 323/283 |
| 5,751,140 A | | 5/1998 | Canter | 323/282 |
| 5,793,191 A | * | 8/1998 | Elmore et al. | 323/282 |
| 5,883,797 A | * | 3/1999 | Amaro et al. | 323/272 |
| 5,943,227 A | * | 8/1999 | Bryson et al. | 323/283 |
| 5,949,226 A | * | 9/1999 | Tanaka et al. | 323/285 |
| 6,020,729 A | * | 2/2000 | Stratakos et al. | 323/283 |
| 6,031,361 A | * | 2/2000 | Burstein et al. | 323/224 |
| 6,100,676 A | * | 8/2000 | Burstein et al. | 323/283 |
| 6,268,716 B1 | * | 7/2001 | Burstein et al. | 323/272 |
| 6,366,437 B1 | * | 4/2002 | Graube | 361/93.9 |
| 6,369,997 B2 | * | 4/2002 | Graube | 361/93.9 |

OTHER PUBLICATIONS

Kassakian et al., "High–Frequency Switching dc/dc Converters," *Principles of Power Electronics,* Addison–Wesley Publishing Co., Dec. 1991, Chapter 6, pp. 103–137.

Kassakian et al., "Dynamics and Control: An Overview," *Principles of Power Electronics,* Addison–Wesley Publishing Co., Dec. 1991, Chapter 11, pp. 253–298.

Kassakian et al., "Discrete–Time or Sampled–Data Models," *Principles of Power Electronics,* Addison–Wesley Publishing Co., Dec. 1991, Sec. 12.5, pp. 313–315.

Kassakian et al., "Feedback Control Design," *Principles of Power Electronics,* Addison–Wesley Publishing Co., Dec. 1991, Chapter 14, pp. 365–402.

* cited by examiner

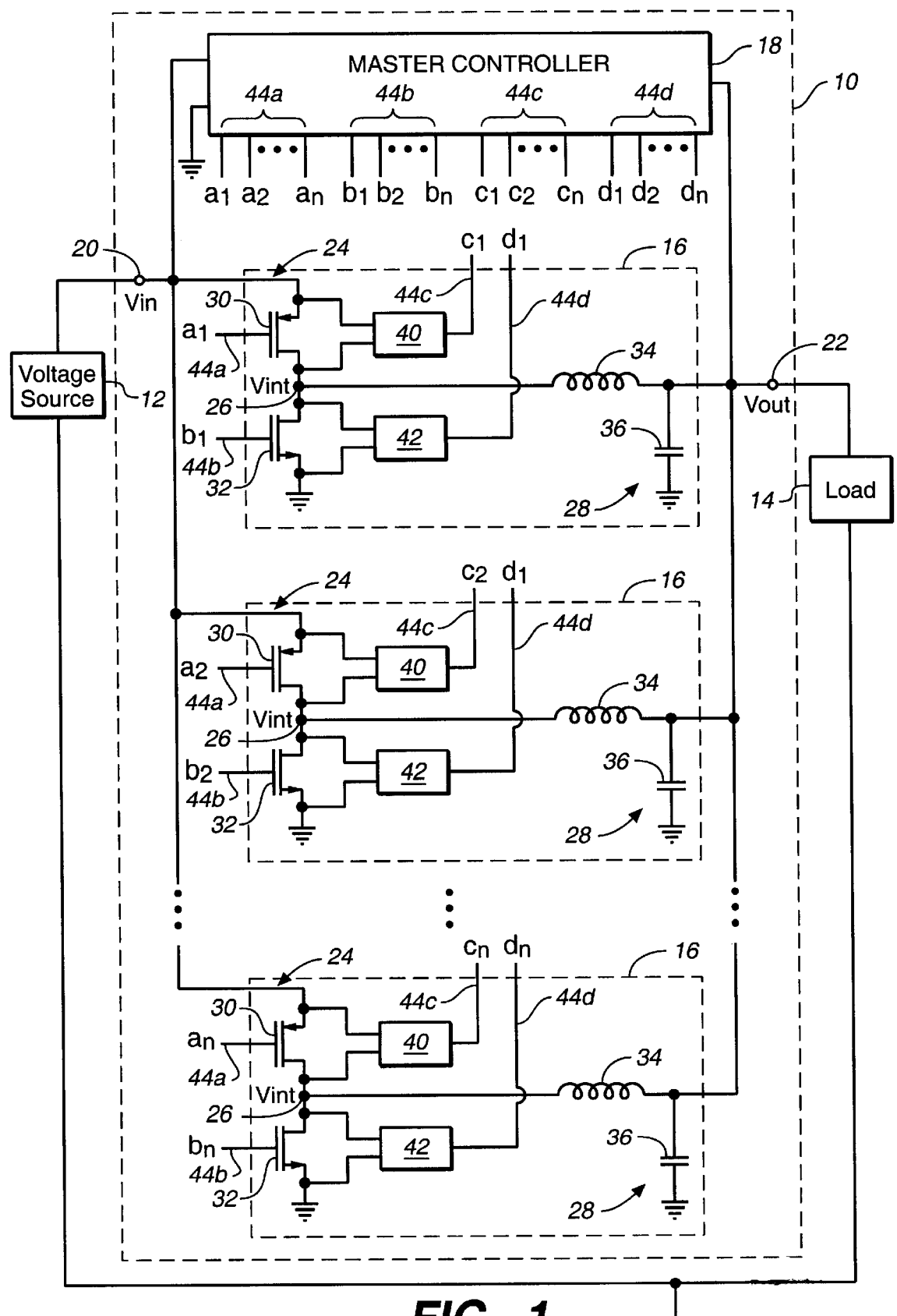
FIG._1

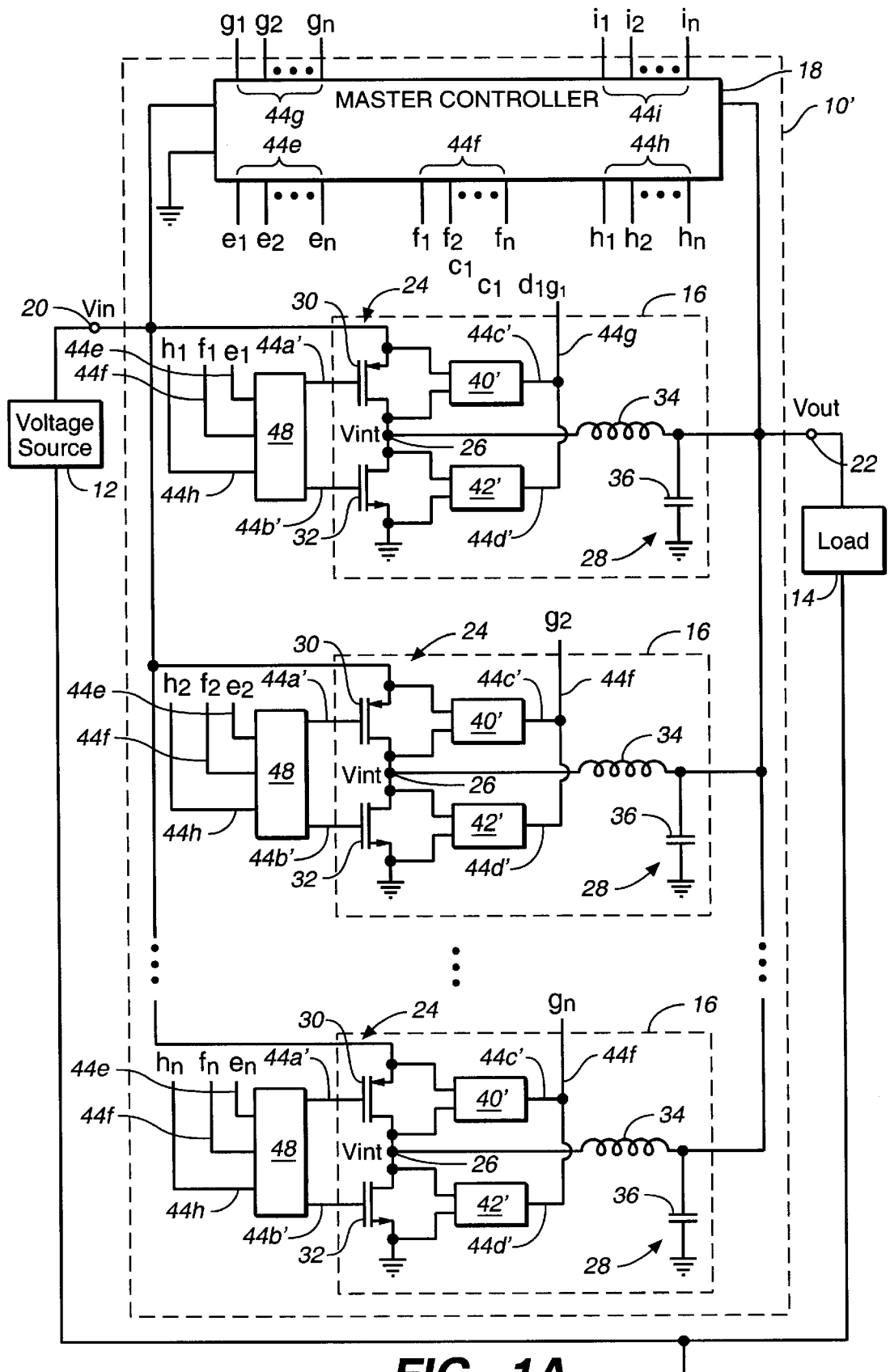
FIG._1A

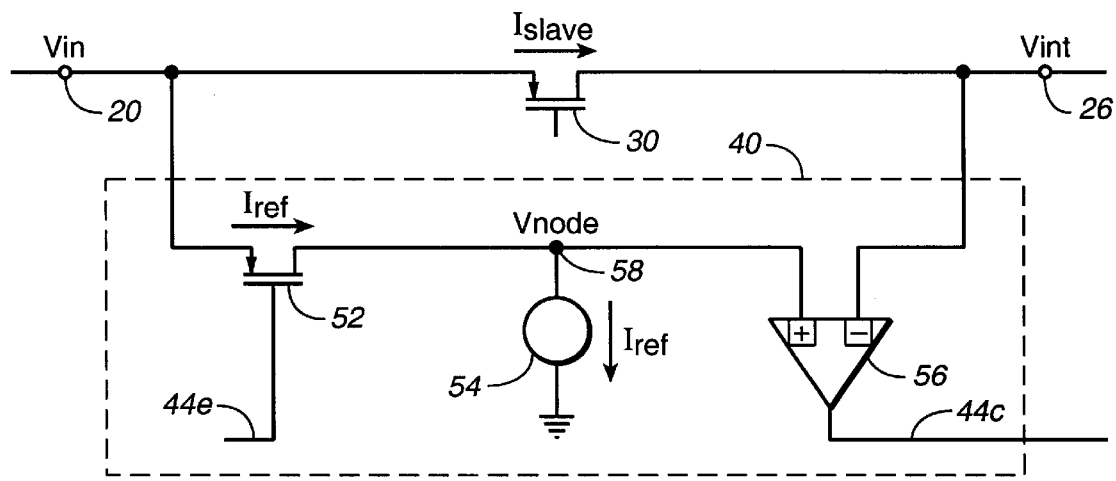
FIG._2
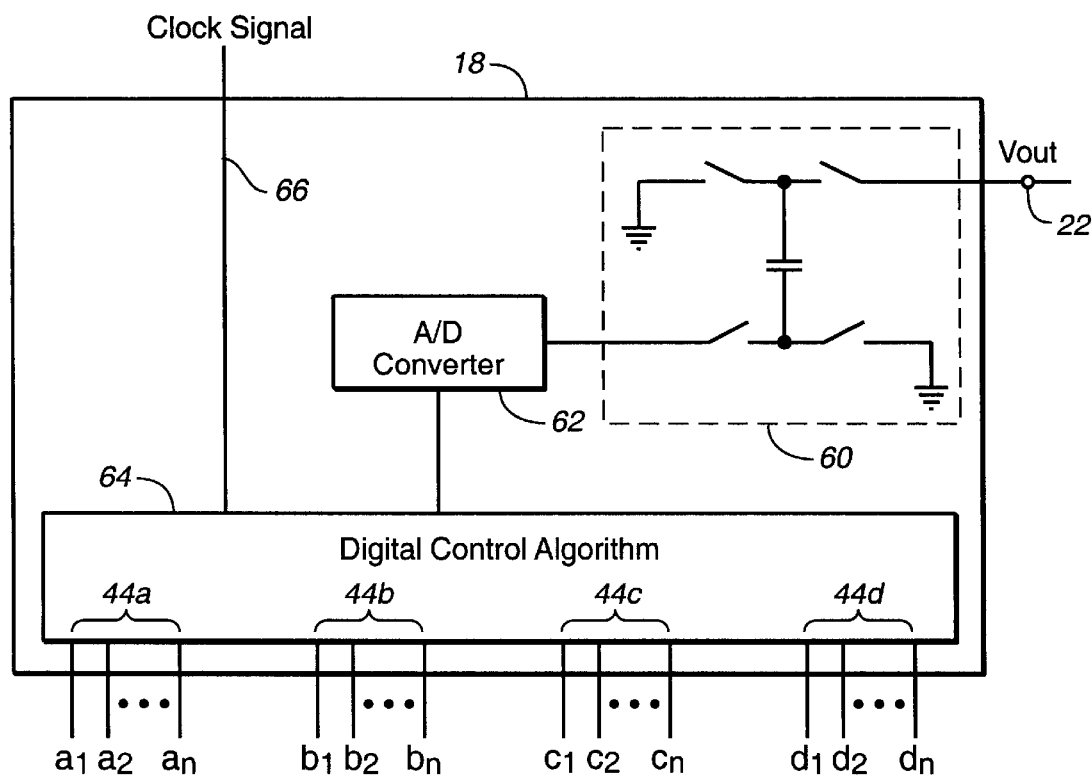
FIG._3

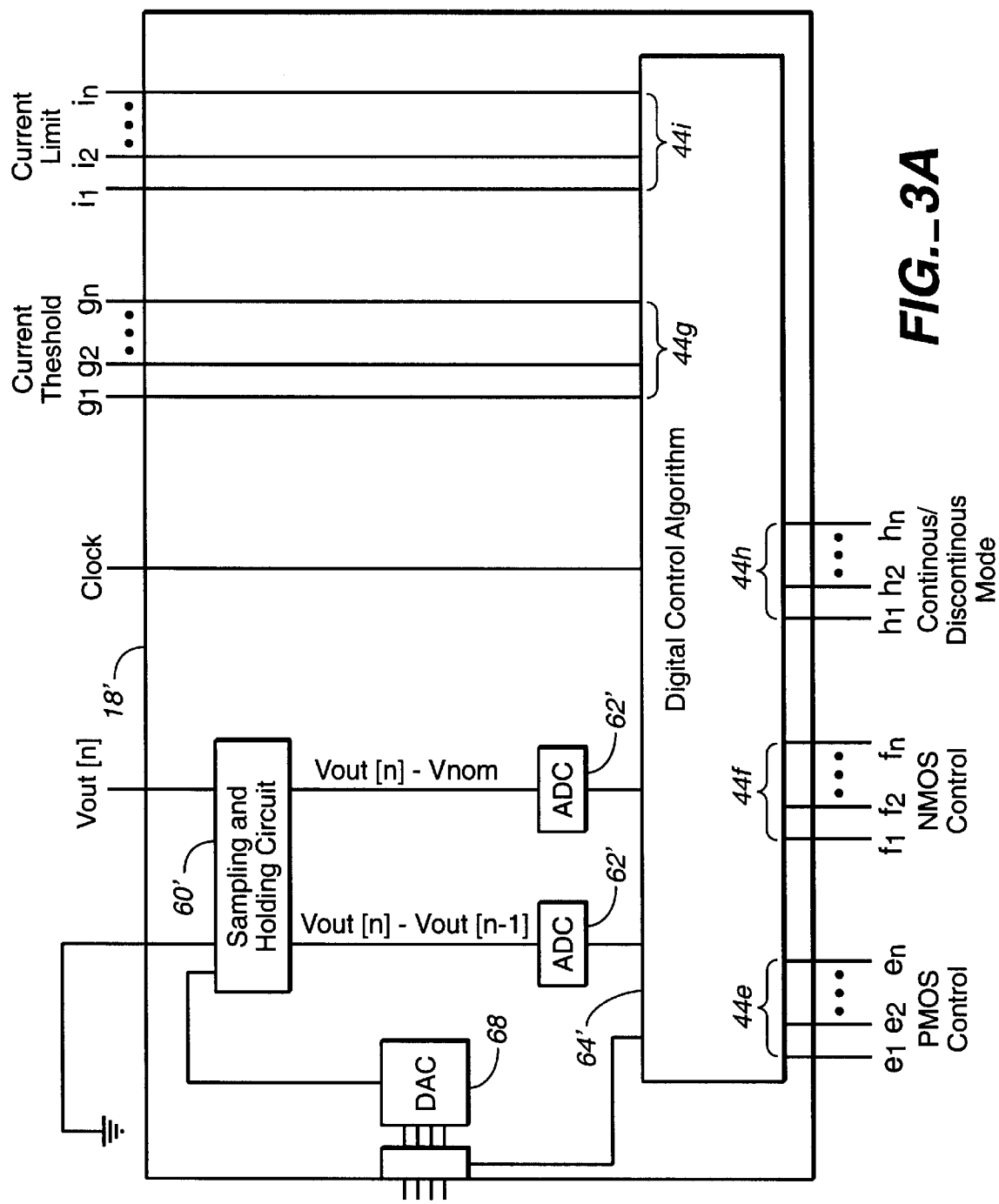
FIG._3A

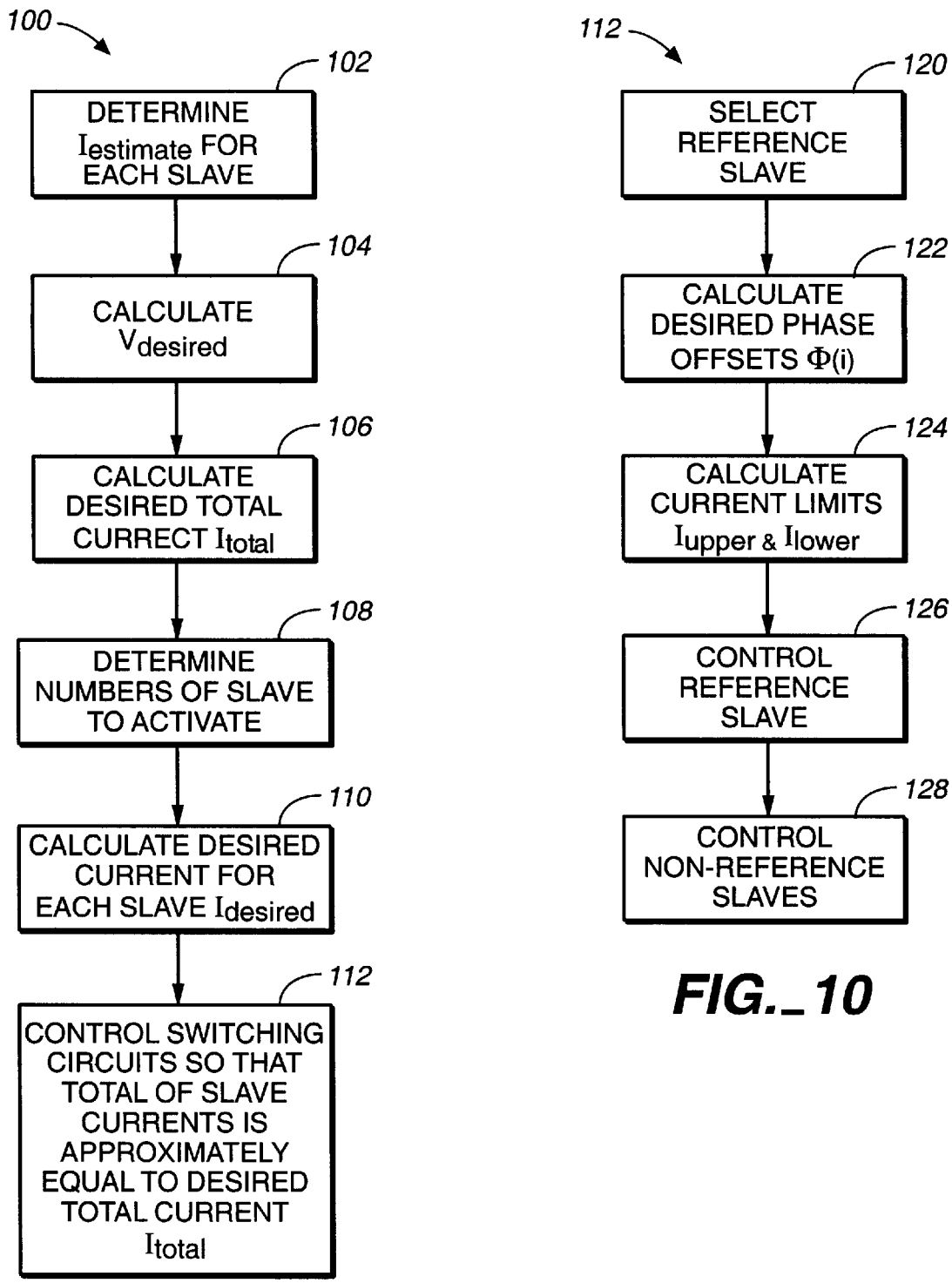
FIG._4
FIG._10

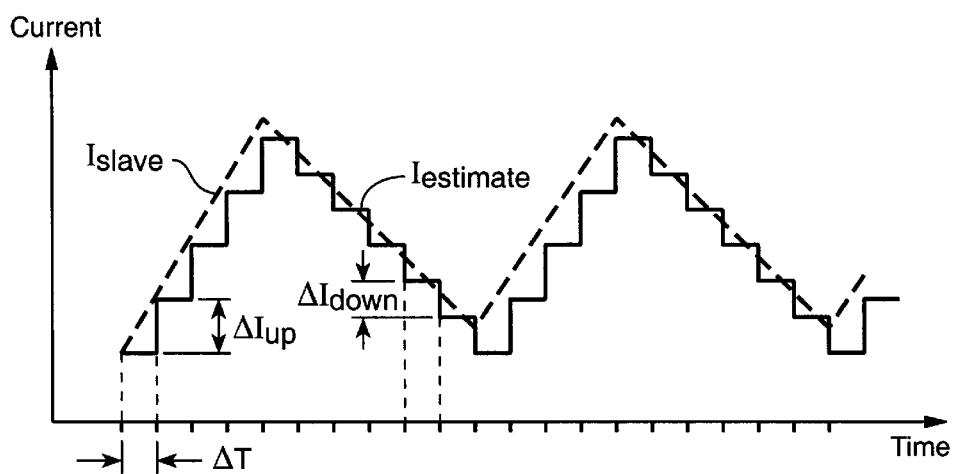
FIG._5
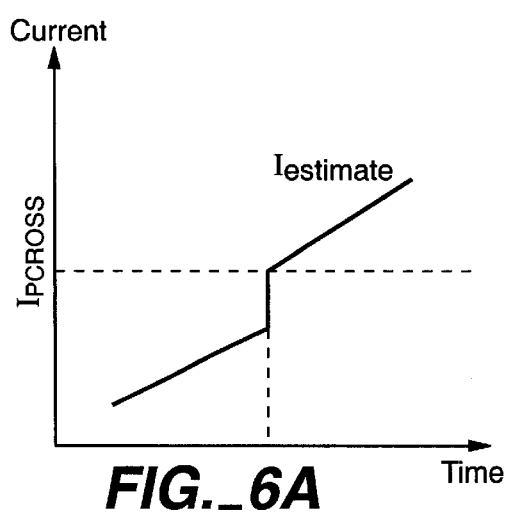
FIG._6A
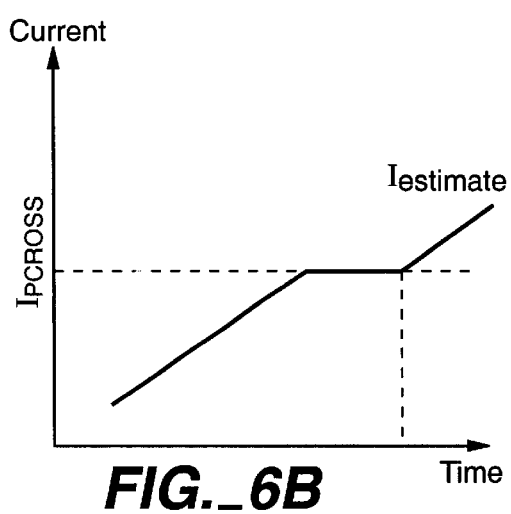
FIG._6B
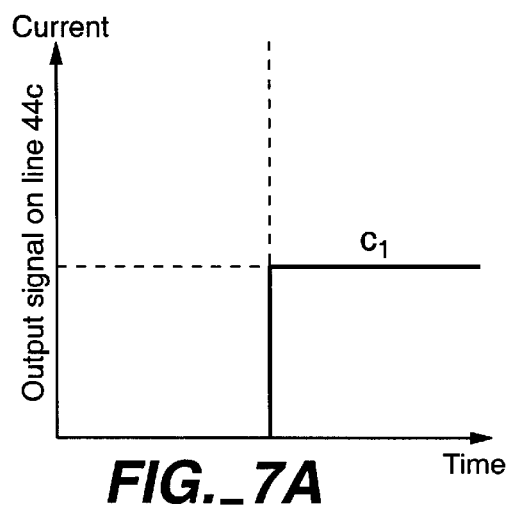
FIG._7A
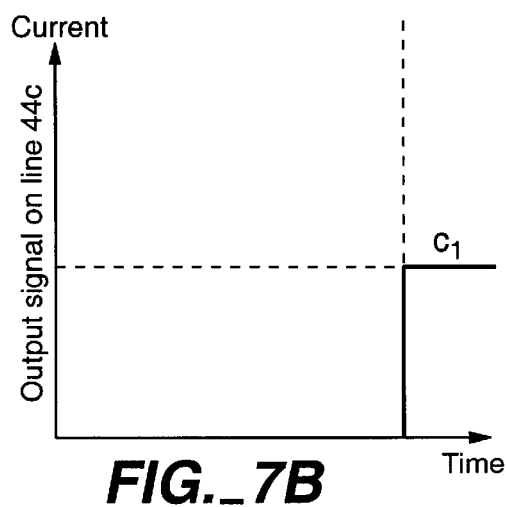
FIG._7B

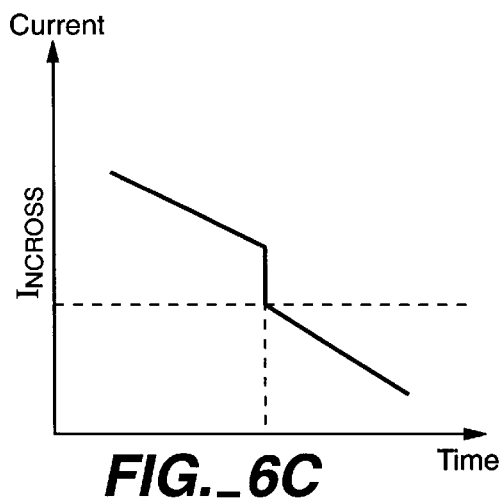
FIG._6C
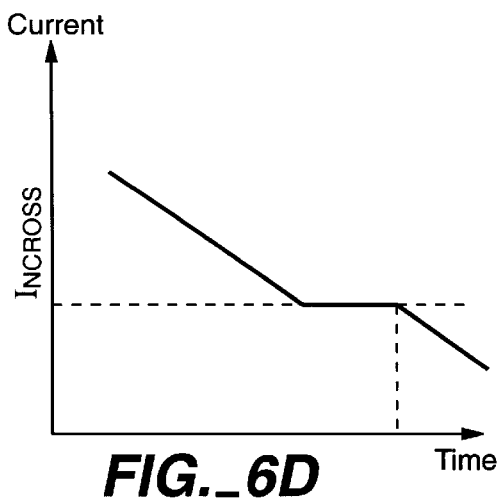
FIG._6D
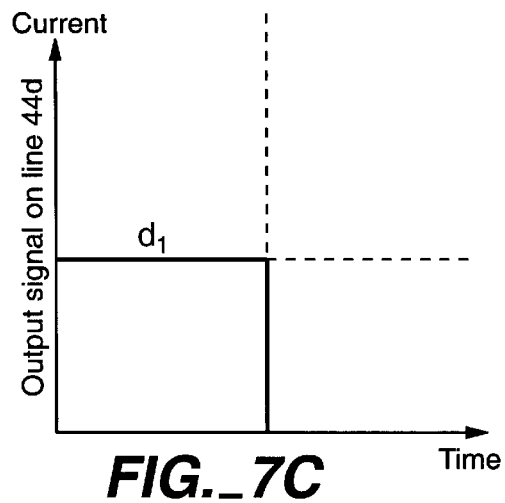
FIG._7C
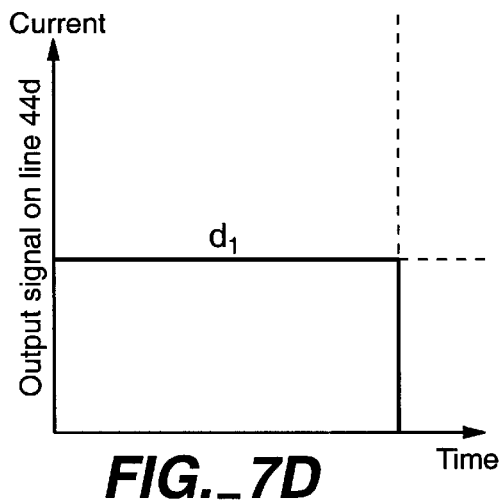
FIG._7D
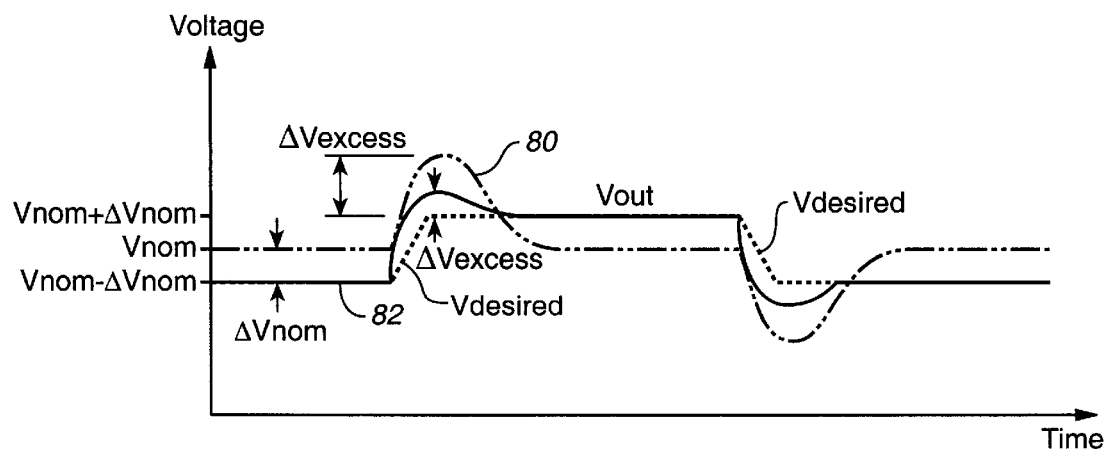
FIG._8

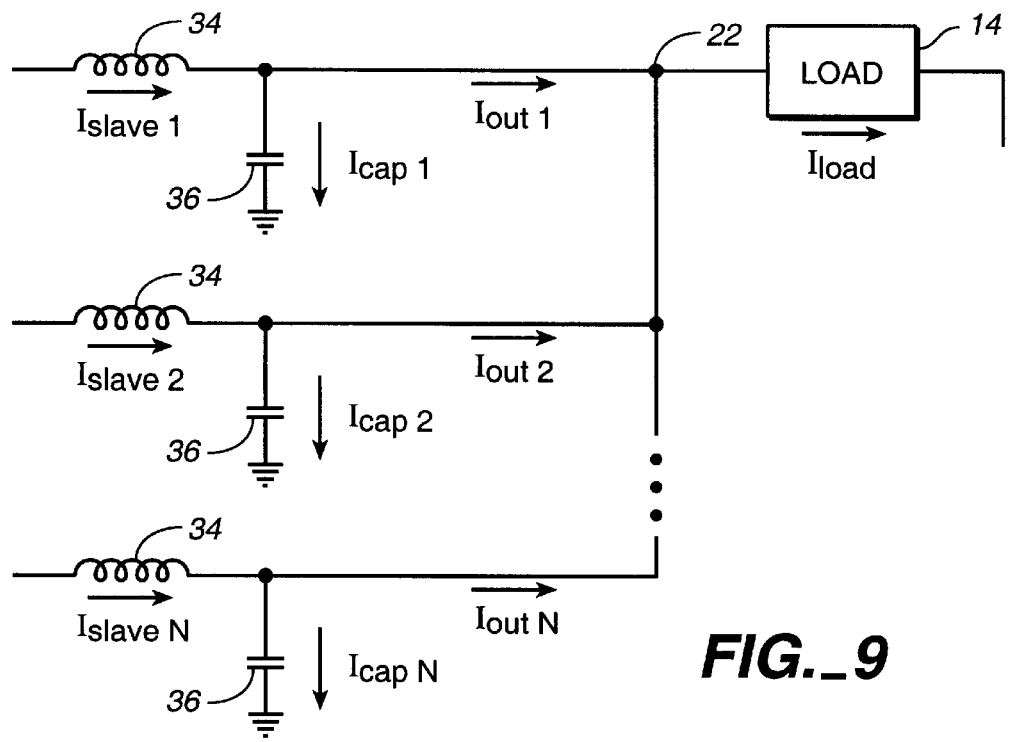
FIG._9
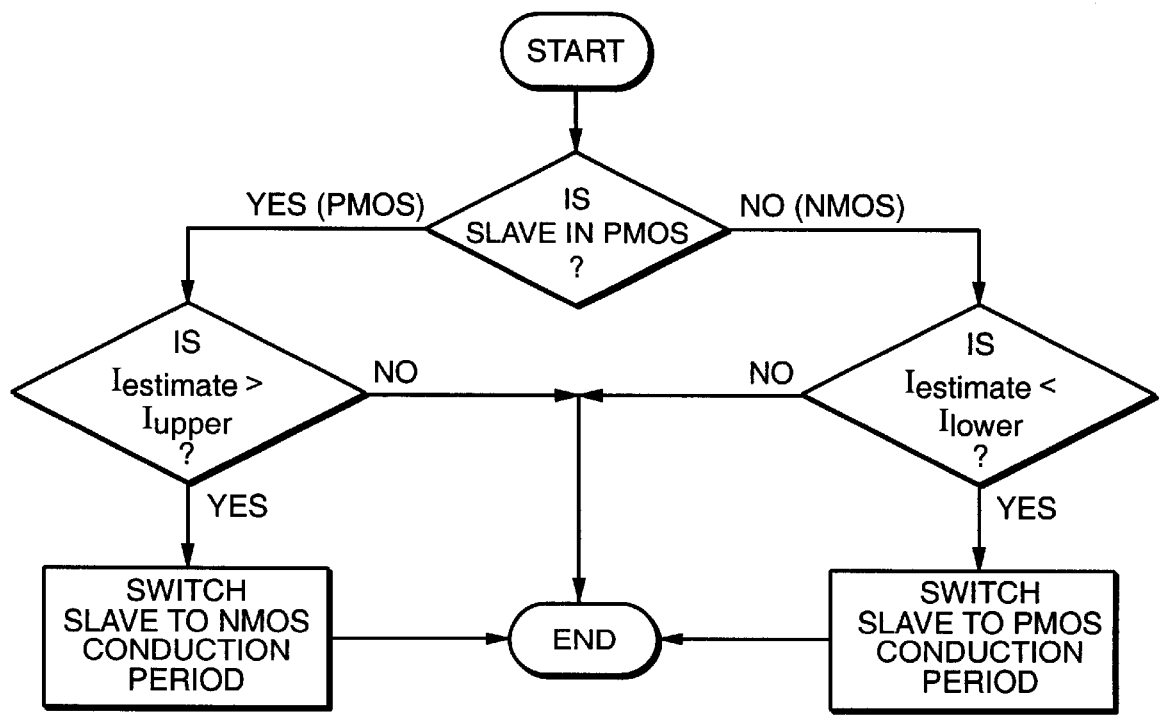
FIG._11

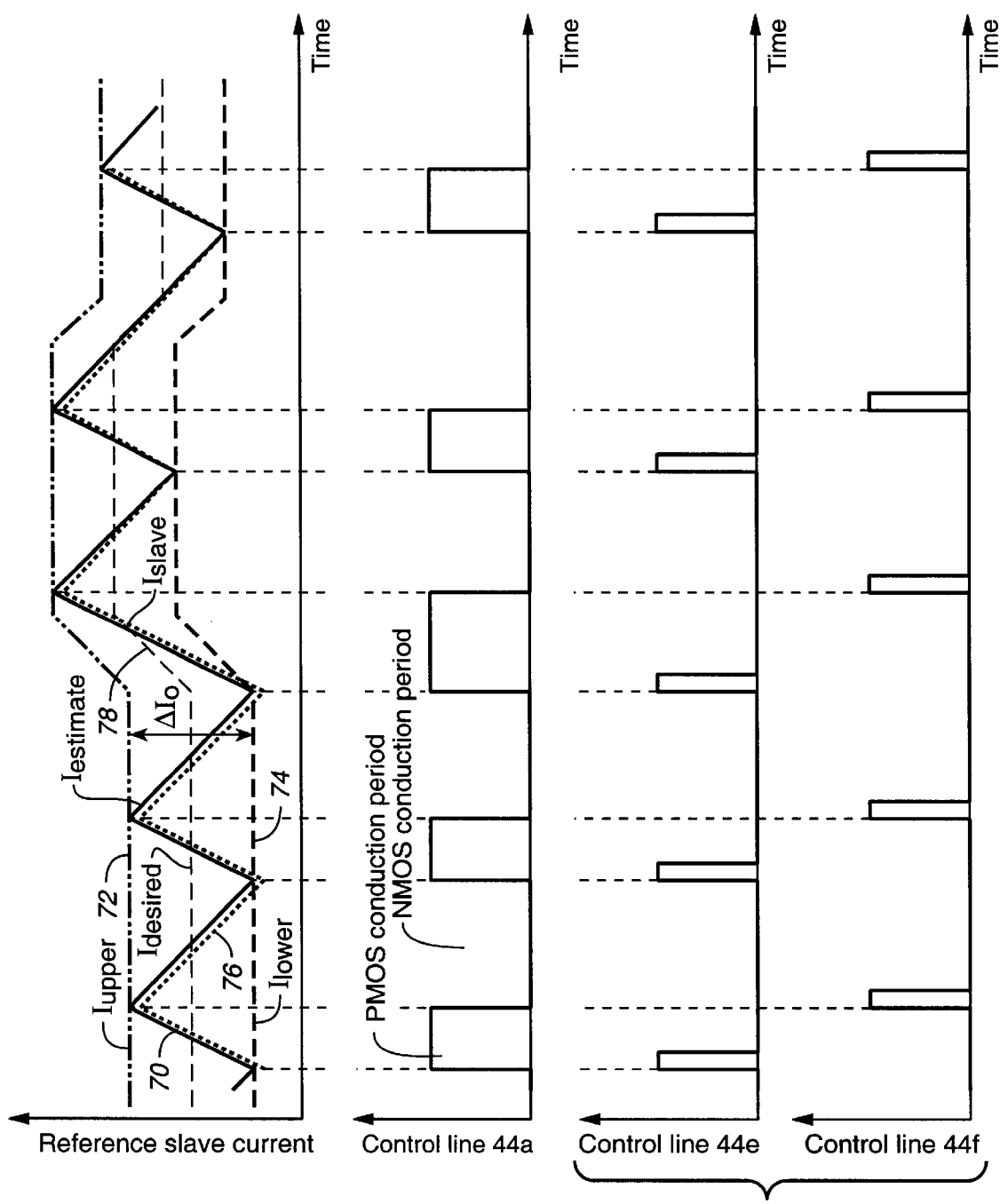
FIG._12    FIG._13    FIG._13A

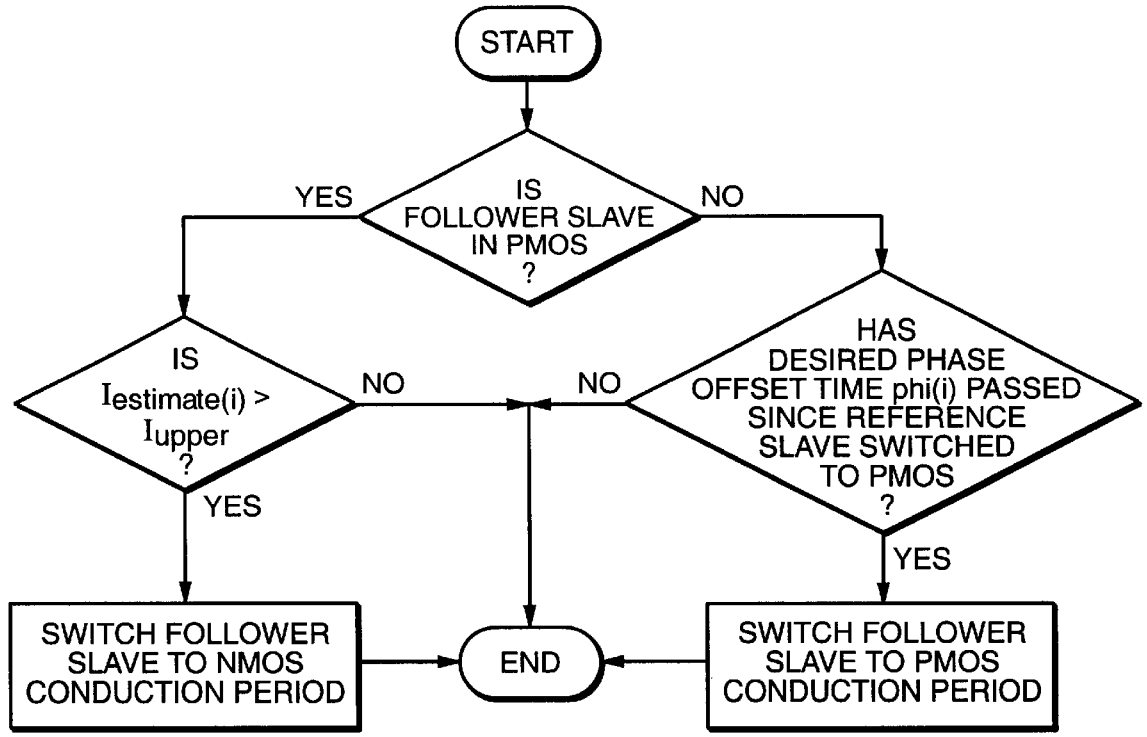
FIG._14
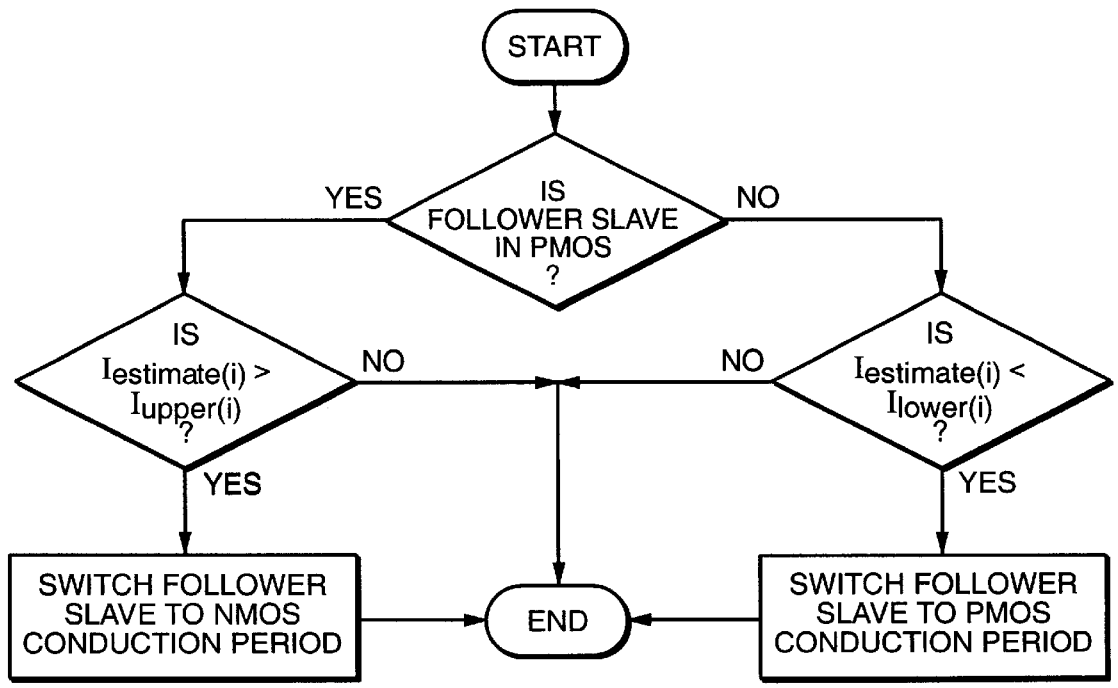
FIG._16

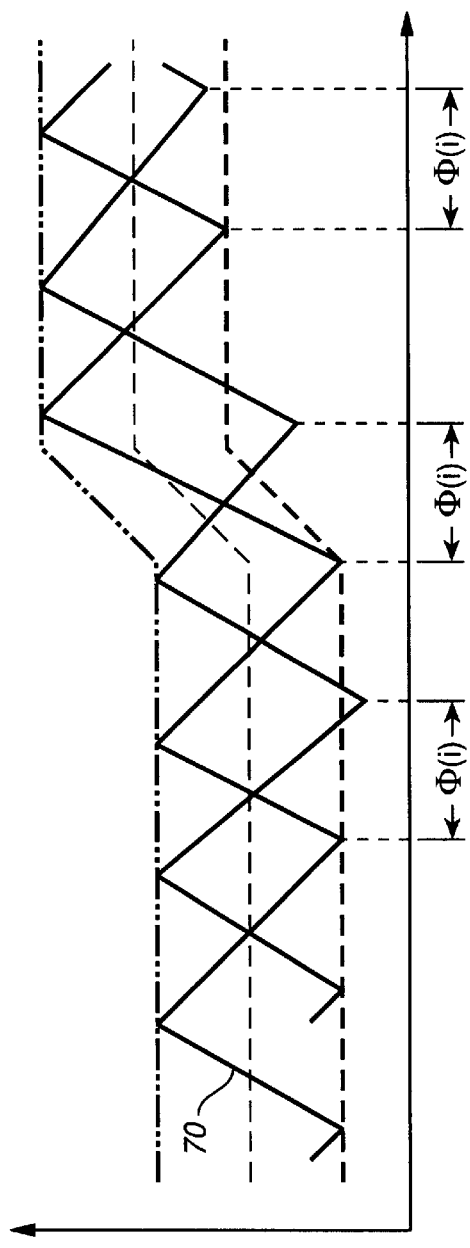
FIG._15
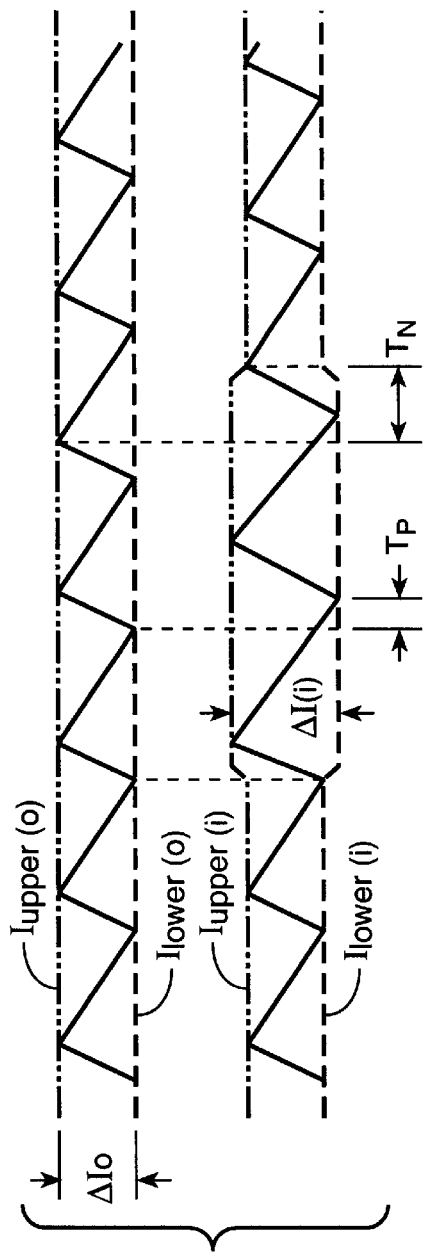
FIG._17

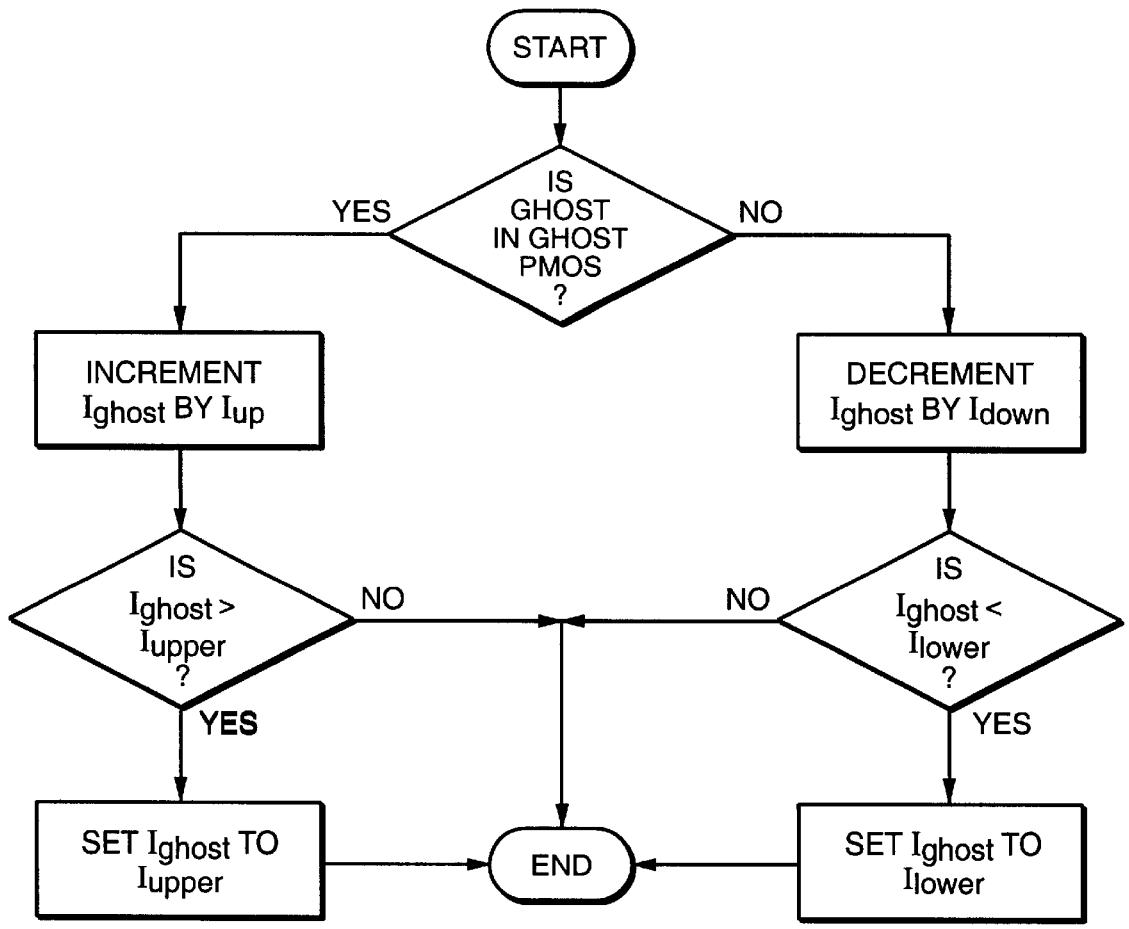
FIG._18

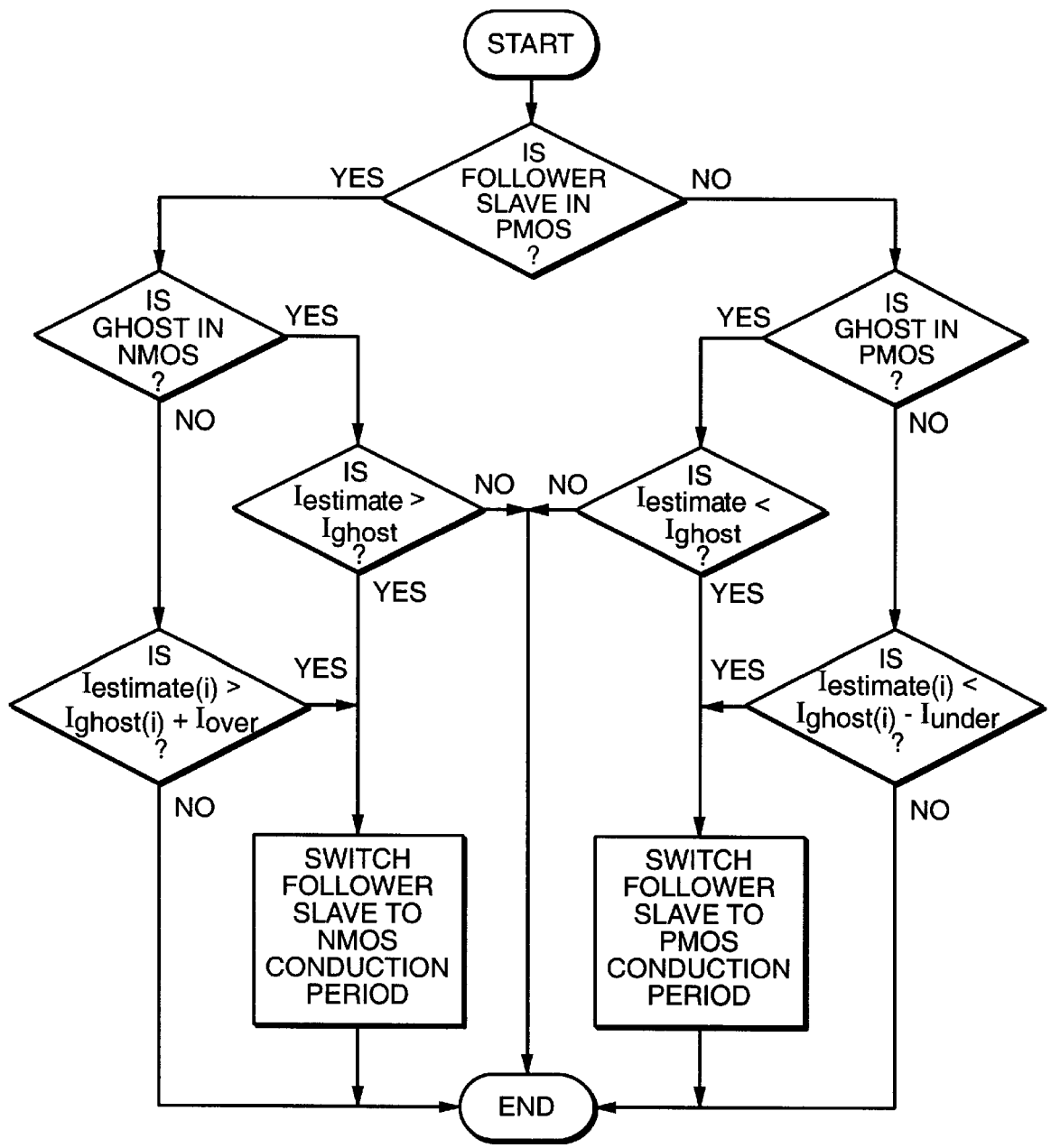
FIG._19

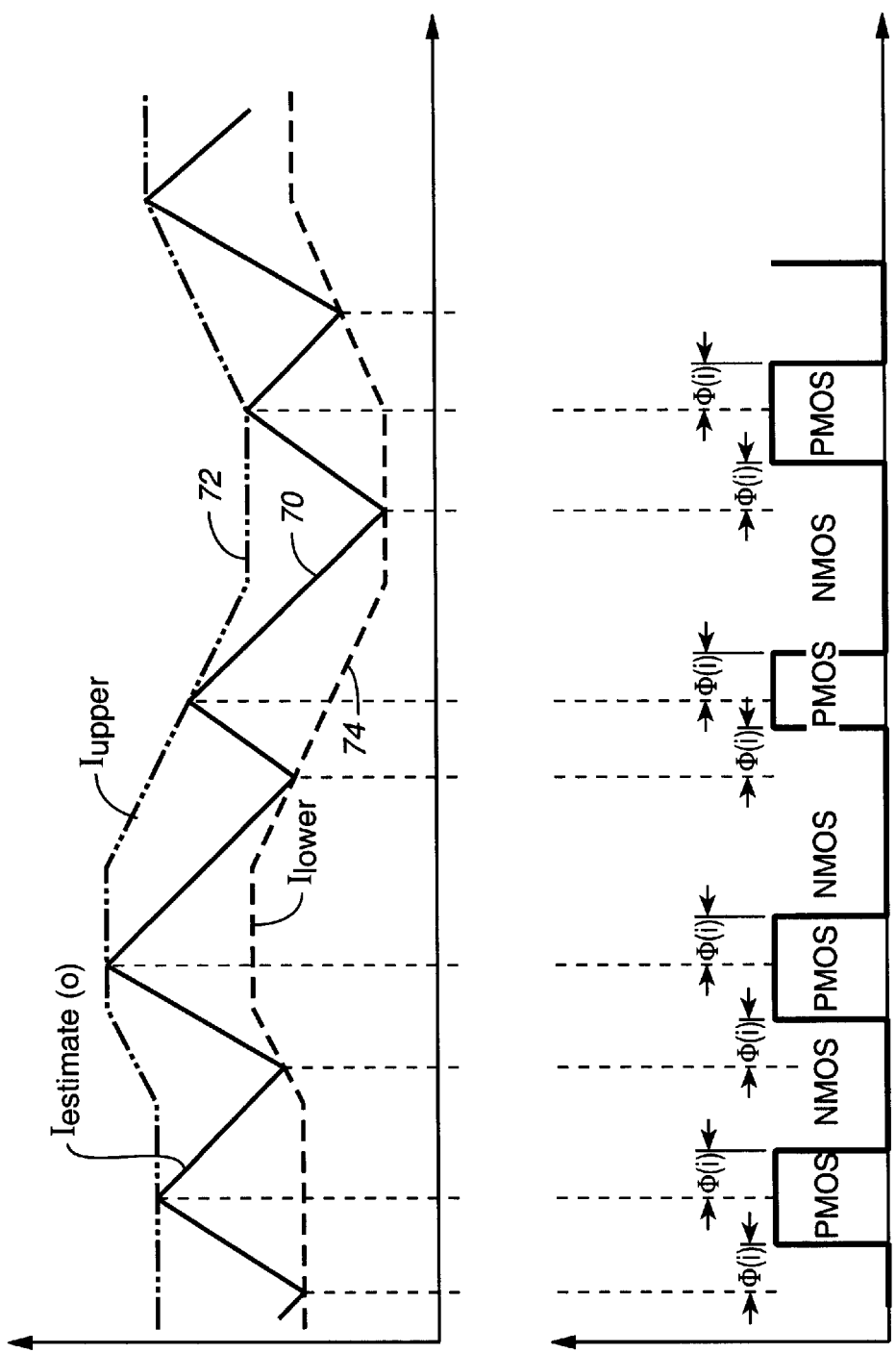
FIG._20
FIG._21

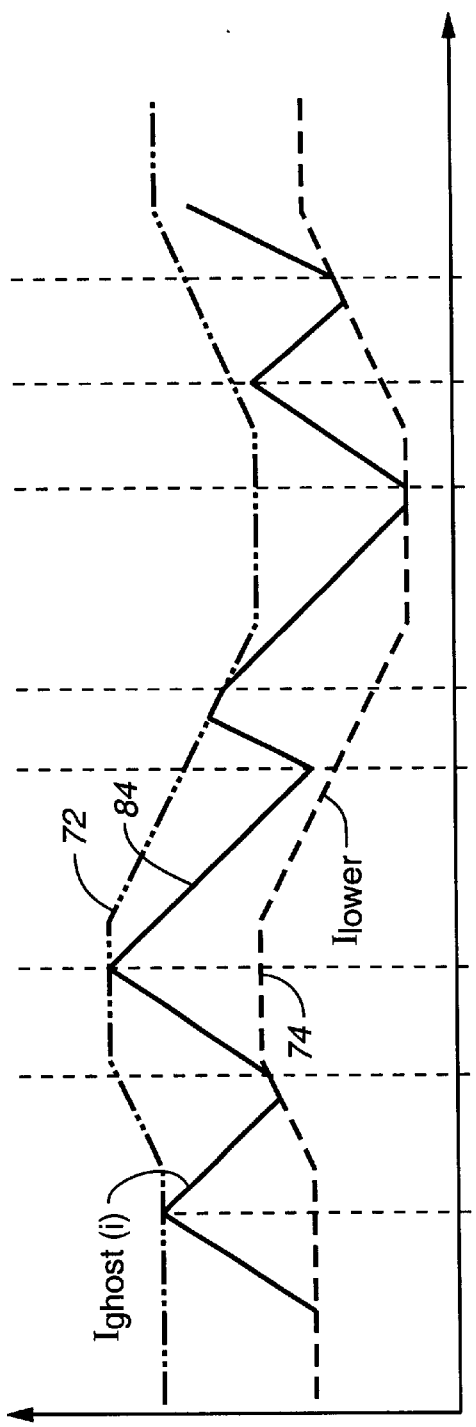
FIG._22
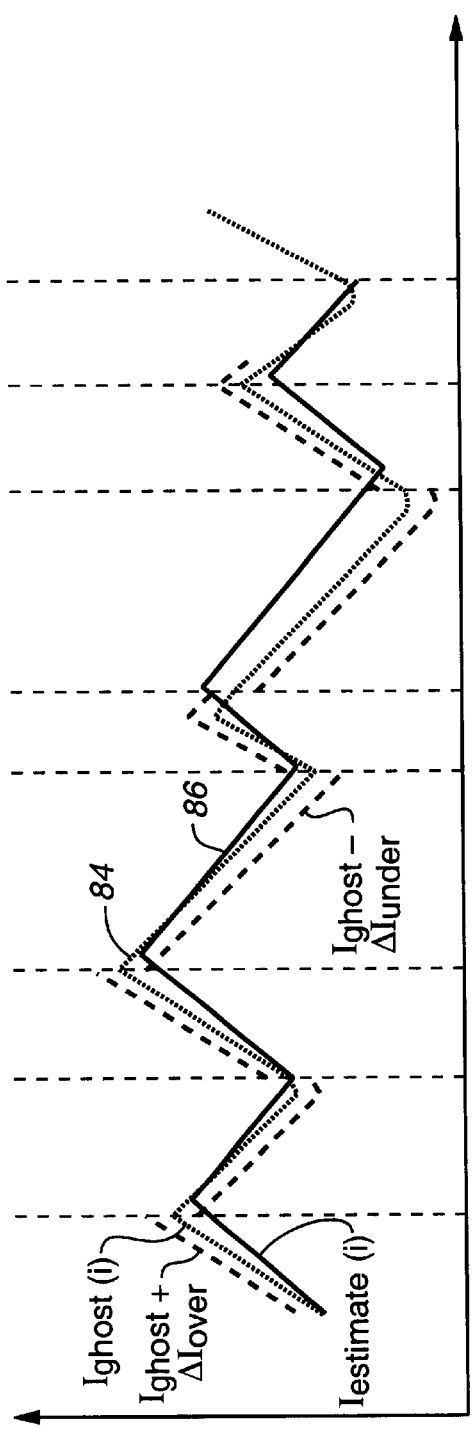
FIG._23

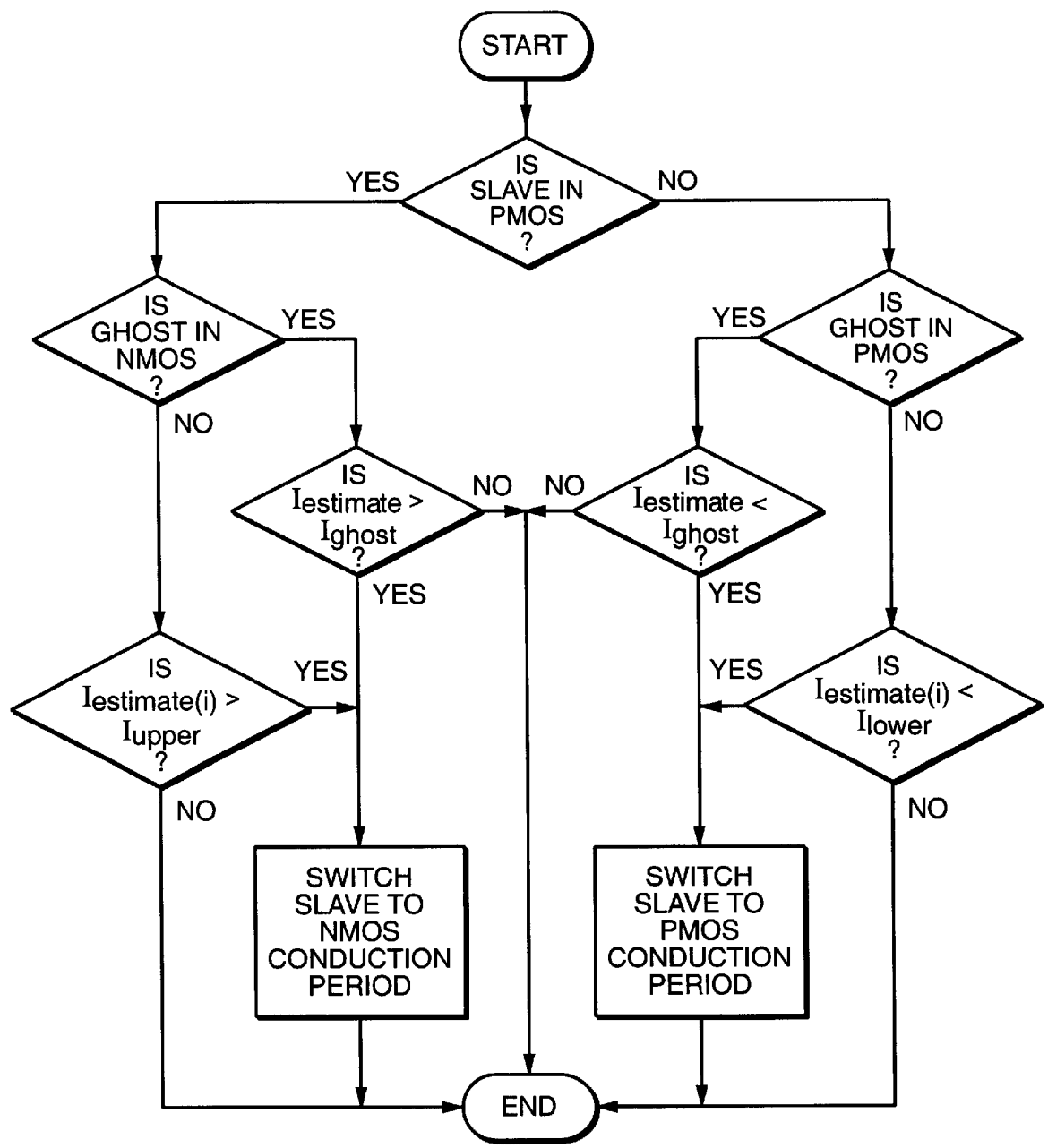
FIG._24

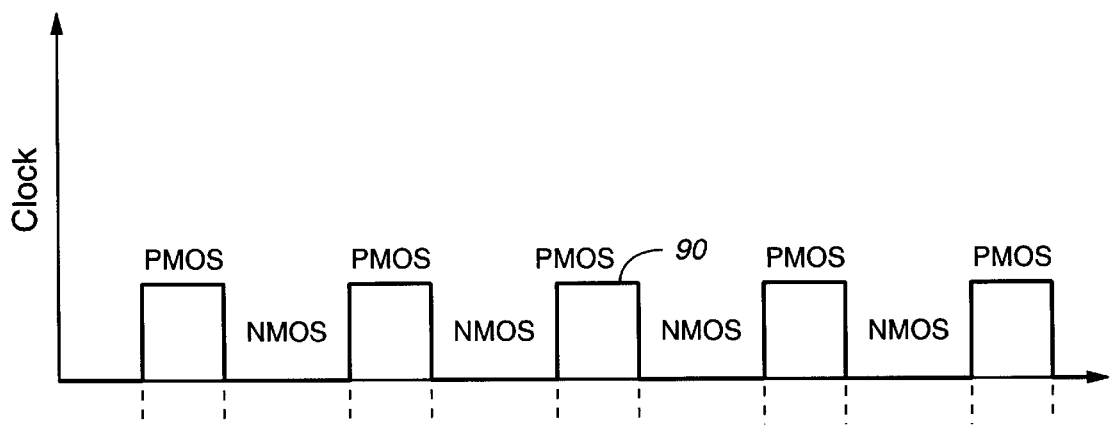
FIG._25
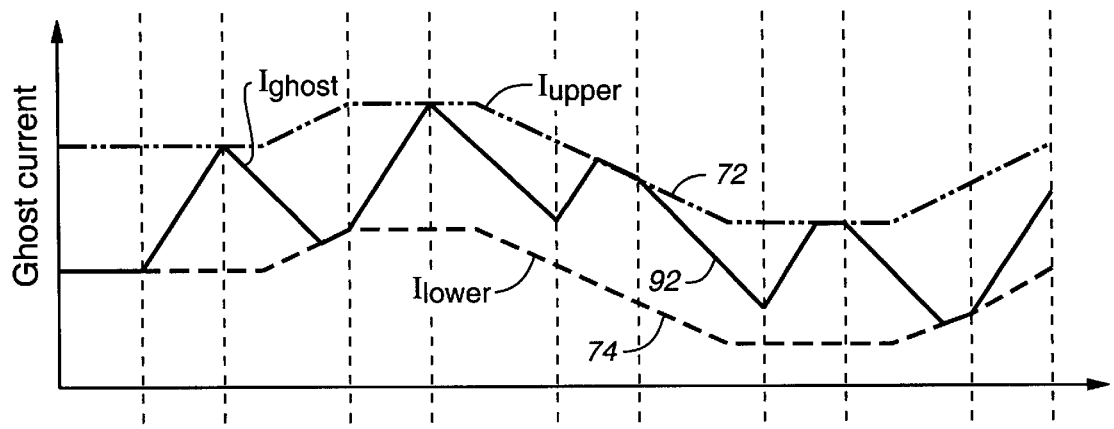
FIG._26
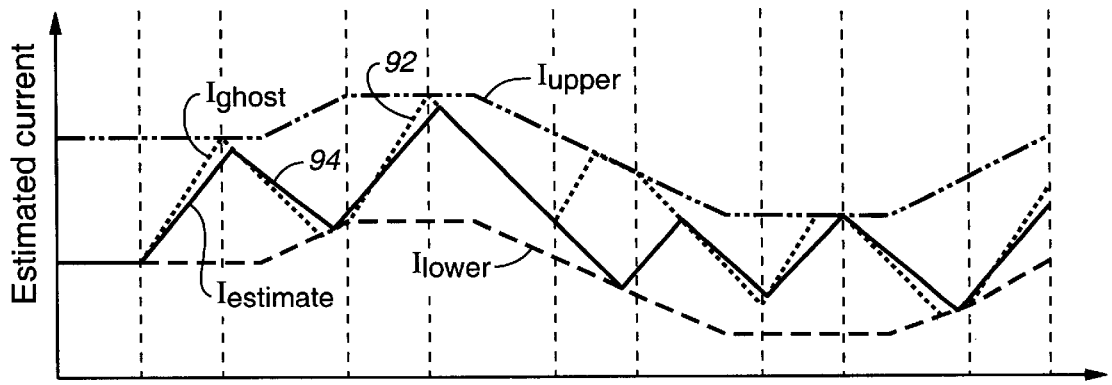
FIG._27

DIGITAL VOLTAGE REGULATOR USING CURRENT CONTROL

This application is a continuation of U.S. patent application Ser. No. 09/183,448, filed Oct. 30, 1998 now U.S. Pat. No. 6,268,716.

BACKGROUND

The present invention relates generally to voltage regulators, and more particularly to control systems for switching voltage regulators.

Voltage regulators, such as DC to DC converters, are used to provide stable voltage sources for electronic systems. Efficient DC to DC converters are particularly needed for battery management in low power devices, such as laptop notebooks and cellular phones. Switching voltage regulators (or more simply "switching regulators") are known to be an efficient type of DC to DC converter. A switching regulator generates an output voltage by converting an input DC voltage into a high frequency voltage, and filtering the high frequency voltage to generate the output DC voltage. Typically, the switching regulator includes a switch for alternately coupling and de-coupling an unregulated input DC voltage source, such as a battery, to a load, such as an integrated circuit. An output filter, typically including an inductor and a capacitor, is coupled between the input voltage source and the load to filter the output of the switch and thus provide the output DC voltage. A controller measures an electrical characteristic of the circuit, e.g., the voltage or current passing through the load, and sets the duty cycle of the switch in order to maintain the output DC voltage at a substantially uniform level.

Voltage regulators for microprocessors are subject to ever more stringent performance requirements. One trend is to operate at higher currents, e.g., 35–50 amps. Another trend is to turn on or off different parts of the microprocessor in each cycle in order to conserve power. This requires that the voltage regulator react very quickly to changes in the load, e.g., several nanoseconds to shift from the minimum to the maximum load. Still another trend is to place the voltage regulator close to the microprocessor in order to reduce parasitic capacitance, resistance and/or inductance in the connecting lines and thereby avoid current losses. However, in order to place the voltage regulator close to the microprocessor, the voltage regulator needs to be small and have a convenient form factor.

In addition to these specific trends, high efficiency is generally desirable in order to avoid thermal overload at high loads and to increase battery life in portable systems. Another desirable feature is for the voltage regulator to have a "standby mode" which consumes little power at low loads.

Conventional controllers are constructed from analog circuits, such as resistors, capacitors and op-amps. Unfortunately, analog circuits are expensive and/or difficult to fabricate as integrated circuits. Specifically, special techniques are needed to fabricate resistors and semiconductor devices. In addition, analog signals can be degraded by noise, resulting in a loss of information.

In view of the foregoing, there is room for improvement in voltage regulators and control systems for voltage regulators.

SUMMARY

In general, in one aspect, the invention is directed to a voltage regulator. The regulator has an input terminal coupled to an input voltage source and an output terminal coupled to a load. A switching circuit intermittently couples the input terminal and the output terminal in response to a digital control signal. A filter provides a generally DC output voltage at the output terminal. A current sensor generates a digital first feedback signal representing the current passing through the switching circuit. A voltage sensor generates a second feedback signal representing the output voltage. A digital controller receives and uses the digital feedback signal to generate the digital control signal. The digital controller is configured to maintain the output voltage at the output terminal at a substantially constant level.

In another aspect, the invention is directed to a voltage regulator having an input terminal coupled to an input voltage source and an output terminal coupled to a load. The voltage regulator has a plurality of slaves, each slave having a switching circuit to intermittently couple the input terminal and the output terminal in response to a digital control signal, a filter to provide a generally DC output voltage at the output terminal, a current sensor to generate a digital feedback signal representing the current passing through the switching circuit, and a digital controller which receives and uses the digital feedback signals from the slave plurality of slaves to generate the plurality of digital control signals. The digital controller is configured to maintain the output voltage at the output terminal at a substantially constant level.

In another aspect, the invention is directed to a method of operating a voltage regulator which has an input terminal coupled to an input voltage source and an output terminal coupled to a load. The input terminal and the output terminal are coupled intermittently by a switching circuit in response to a digital control signal. An output of the switching circuit is filtered to provide a generally DC output voltage at the output terminal. A digital feedback signal is generated representing the current passing through the switching circuit with a current sensor. A digital controller receives and uses the digital feedback signal from the slave to generate the digital control signal. The digital controller is configured to maintain the output voltage at the output terminal at a substantially constant level.

In another aspect, the invention is directed to a voltage regulator having an input terminal coupled to an input voltage source and an output terminal coupled to a load. A switching circuit intermittently couples the input terminal and the output terminal in response to a control signal. A filter provides a generally DC output voltage at the output terminal. A digital controller operates at a clock frequency $f_{clock}$ which is significantly faster than a desired switching frequency $f_{switch}$ of the switching circuit. Each clock cycle the digital controller receives a first digital feedback signal derived from an output voltage at the output terminal and a second digital feedback signal derived from a current passing through the switching circuit, and generates the control signal to control the switching circuit so that the output voltage is maintained at a substantially constant level.

In another aspect, the invention is directed to a method of operating a voltage regulator which has an input terminal coupled to an input voltage source and an output terminal coupled to a load. The input terminal and the output terminal are intermittently coupled by a switching circuit in response to a control signal. An output of the switching circuit is filtered to provide a generally DC output voltage at the output terminal. A digital controller is operated at a clock frequency $f_{clock}$ which is significantly faster than a desired switching frequency $f_{switch}$ of the switching circuit. The digital controller receives a first digital feedback signal derived from an output voltage at the output terminal and a second digital feedback signal derived from a current passing through the inductor each clock cycle each clock cycle. The control signal is generated with the digital controller to control the switching circuit so that the output voltage is maintained at a substantially constant level.

Advantages of the invention may include the following. The voltage regulator handles relatively large currents reacts quickly to changes in the load. The voltage regulator may use small capacitors with a convenient form factor. The voltage regulator can include multiple slaves which are operated out of phase in order to reduce current ripple. The use of analog circuits is minimized by converting analog measurements in the controller into digital signals. The controller may be implemented using mostly digital circuitry, and may be fabricated using known processes through conventional complementary metal oxide semiconductor (CMOS) fabrication techniques. This reduces the number of off-chip components in the controller. The controller operates with a digital control algorithm in which the operating parameters may be modified to adapt the voltage regulator for different applications. The digital control algorithm can operate at clock frequency significantly higher than the switching frequency, allowing quick response to changes in the load. The master and slaves can communicate with digital signals, thereby providing improved communication reliability.

BRIEF DESCRIPTION OF THE DRAWINGS

FIG. 1 is a block diagram of a switching regulator in accordance with the present invention.

FIG. 1A is a block diagram of another implementation of a switching regulator in accordance with the present invention.

FIG. 2 is a schematic circuit diagram of a current sensor from the switching regulator of FIG. 1.

FIG. 3 is a block diagram of a controller from the switching regulator of FIG. 1.

FIG. 3A is a block diagram of a controller from the switching regulator of FIG. 1A.

FIG. 4 is a flow chart showing a method performed by the controller of FIG. 3.

FIG. 5 is a timing diagram comparing an estimated current to the actual current passing through a slave.

FIGS. 6A–6D are timing diagrams illustrating the correction of the estimated current.

FIGS. 7A–7D are timing diagrams illustrating the output signal from a current sensor associated with the correction of the estimated current in FIGS. 6A–6D.

FIG. 8 is a timing diagram comparing a desired voltage to the actual output voltage of the switching regulator.

FIG. 9 is a simplified schematic circuit diagram for use in determining a desired current.

FIG. 10 is a flow chart showing the step of controlling the switching circuits from the method of FIG. 4.

FIG. 11 is a flow chart illustrating a method of controlling a reference slave from the switching regulator of FIG. 1.

FIG. 12 is a timing diagram illustrating a current passing through a reference slave resulting from the method of FIG. 11.

FIG. 13 is a timing diagram illustrating a control signal to the reference slave of FIG. 11.

FIG. 13A is a timing diagram illustrating a control signal to a reference slave from the switching regulator of FIG. 1A.

FIG. 14 is flow chart illustrating a method of controlling the phase relationship of the slaves in which one transistor is switched a preset time following the switching of the reference slave and the other transistor is switched based on a comparison of the estimated current to a current limit.

FIG. 15 is a timing diagram illustrating the currents passing through the reference slave and a non-reference slave resulting from the method of FIG. 14.

FIG. 16 is a flow chart illustrating a method of controlling the phase relationship of the slaves in which the current limits of the non-reference slaves are adjusted.

FIG. 17 is a timing diagram illustrating the currents passing through the reference slave and a non-reference slave resulting from the method of FIG. 16.

FIG. 18 is a flow chart illustrating a method of generating a ghost current for a non-reference slave.

FIG. 19 is a flow chart illustrating a method of controlling the phase relationship of the slaves in which the estimate slave current is compared to the ghost current.

FIG. 20 is a timing diagram illustrating the current passing through the reference slave during the method of FIGS. 18 and 19.

FIG. 21 is a timing diagram illustrating the ghost conduction states for one of the non-reference slaves resulting from the reference slave current shown by FIG. 20.

FIG. 22 is a timing diagram illustrating the ghost current resulting from the method shown by FIG. 18 and the ghost conduction states shown by FIG. 21.

FIG. 23 is a timing diagram illustrating the reference slave performance resulting from the method shown by FIG. 19 and the ghost current shown by FIG. 22.

FIG. 24 is a flow chart illustrating a method of controlling the phase relationship of the slaves in which a ghost current is generated for the reference and the non-reference slaves, and the estimated slave current is compared to the ghost current to control the slaves.

FIG. 25 is a timing diagram illustrating the ghost conduction states for one of the non-reference slaves resulting from a clock signal.

FIG. 26 is a timing diagram illustrating the ghost current resulting from the method shown by FIG. 18 and the ghost conduction states shown by FIG. 25.

FIG. 27 is a timing diagram illustrating the slave performance resulting from the method shown by FIG. 24 and the ghost current shown by FIG. 26.

DETAILED DESCRIPTION

Referring to FIG. 1, a switching regulator 10 is coupled to an unregulated DC input voltage source 12, such as a battery, by an input terminal 20. The switching regulator 10 is also coupled to a load 14, such as an integrated circuit, by an output terminal 22. The load 14 typically has an expected nominal voltage $V_{nom}$ and a voltage tolerance $\Delta V_{nom}$. A typical nominal voltage $V_{nom}$ for a microprocessor chip is about 1.0 to 5.0 volts, e.g., about 1.2 to 1.8 volts, and a typical voltage tolerance $\Delta V_{nom}$ is +/−6% of the nominal voltage $V_{nom}$, i.e., about 80 mV for a 1.2 volt nominal voltage. The switching regulator 10 serves as a DC-to-DC converter between the input terminal 20 and the output terminal 22. The switching regulator 10 includes one or more slaves 16 for converting an input voltage $V_{in}$ at the input terminal 20 to an output voltage $V_{out}$ at the output terminal 22 which is within the tolerance $\Delta V_{nom}$ of the nominal voltage $V_{nom}$, and a master controller 18 for controlling the operation of the slaves 16. The master controller 18 may be powered by the voltage source 12 (as illustrated) or by another voltage source.

In brief, the master controller 18 uses a digital current-based control algorithm. Based on the output voltage $V_{out}$ and feedback from the slaves, the control algorithm in the master controller 18 determines the state for each slave 16 to maintain the output voltage $V_{out}$ at a substantially constant level, i.e., within the voltage tolerance. The master controller 18 generates a set of control signals to control each slave 16 and set it to the appropriate state. More particularly, the master controller 18 ensures that the current flowing out of the switching regulator 10 matches the current flowing into the load 14, thereby maintaining the output voltage at a substantially constant level. For example, if the current load (or simply "load") increases, then the amount of current passing through the slaves is increased. This permits the current to "ramp up" until the desired load is reached. On the other hand if the load decreases, the amount of current passing through the active slaves is decreased. This permits the current to "ramp down" until the desired load is achieved.

Each slave 16 includes a switching circuit 24 which serves as a power switch for alternately coupling and decoupling the input terminal 20 to an intermediate terminal 26. The switching circuit 24 also includes a rectifier, such as a switch or diode, coupling the intermediate terminal 26 to ground. The intermediate terminal 26 of each slave is coupled to the output terminal 22 by an output filter 28. The opening and closing of the switching circuit 24 generates an intermediate voltage $V_{int}$ having a rectangular waveform at the intermediate terminal 26. The output filter 28 converts this rectangular waveform into a substantially DC output voltage at the output terminal 22. Although the switching regulator will be illustrated and described below for a buck converter topology, the invention is also applicable to other voltage regulator topologies, such as boost converter or buck-boost converter topologies.

As illustrated, the switching circuit 24 and the output filter 28 are configured in a buck converter topology. Specifically, the switching circuit 24 of each slave 16 includes a switch, such as a first transistor 30 having a source connected to the input terminal 20 and a drain connected to the intermediate terminal 26. The switching circuit 24 also includes a rectifier, such as a second transistor 32 having a source connected to ground and a drain connected to the intermediate terminal 26. The first transistor 30 may be a P-type MOS (PMOS) device, whereas the second transistor 32 may be an N-type MOS (NMOS) device. Alternately, the second transistor 32 may be replaced or supplemented by a diode to provide rectification. The first and second transistors 30 and 32 may be driven by switching signals on control lines 44a and 44b, respectively. The output filter 28 includes an inductor 34 connected between the intermediate terminal 26 and the output terminal 22, and a capacitor 36 connected in parallel with the load 14. In addition, the capacitors 36 from each slave 16 may be supplemented or replaced by one or more capacitors connected to a common line from the inductors 34.

When the first transistor 30 is closed and the second transistor 32 is open (the PMOS conduction state), the intermediate terminal 26 is connected to the voltage source 12, and the voltage source 12 supplies energy to the load 14 and the inductor 34 via the first transistor 30. On the other hand, if the first transistor is open and the second transistor is closed (the NMOS conduction state), the intermediate terminal 26 is connected to ground and the energy is supplied to the load 14 by the inductor 34.

Each slave 16 also includes first and second current sensors 40 and 42 to measure the current flowing through the first and second transistors 30 and 32, respectively. The master controller 18 uses the information from the current sensors 40 and 42 in the current-based control algorithm. Each current sensor generates a digital output signal on one more output lines. For a single-bit signal, the digital output signal on the output line may switch from high to low (or vice versa) when the current passing through the slave exceeds or falls below a trigger current. Specifically, the signal on a first output line 44c from the first current sensor 30 switches from low to high when the current passing through the first transistor exceeds a first trigger current $I_{pcross}$. Similarly, the output signal on a second output line 44d from the second current sensor 42 switches from high to low when the current passing through the second transistor 32 drops below a second trigger current $I_{ncross}$.

As shown in FIG. 1, each output line 44c and 44d may be connected directly to the master controller 18. Alternately, as shown in FIG. 1A, the first and second output lines may be tied together to form a single output line 44g. In this case, the master controller 18' determines whether the signal $g_1$, $g_2$, ..., $g_n$ on the output line 44g represents the current passing through the first or second transistor based on whether the slave is in a PMOS (the first transistor) or NMOS (the second transistor) conduction state.

Referring to FIG. 2, each current sensor, such as first current sensor 40, includes a reference transistor 52, a current source 54, and a comparator 56. A similar current sensor is described in U.S. Pat. No. 6,100,676, the entire disclosure of which is incorporated herein by reference. The reference transistor 52 has a source connected to the source of the transistor being measured, i.e., first transistor 30, a drain connected to the current source 54, and a gate connected to a control line 44e. The reference transistor 52 is matched to the power transistor 30, i.e., the transistor elements are fabricated using the same process on the same chip and with the same dimensions so that they have substantially identical electrical characteristics. A known current $I_{ref}$ flows through the current source 54. A positive input of the comparator 56 is connected to a node 58 between the drain of the reference transistor 52 and the current source 54, and a negative input of the comparator 56 is connected to the intermediate terminal 26. The output of the comparator is connected to the reference line 44c. The second current sensor 42 is constructed similarly, but with the polarity associated with an NMOS transistor.

In operation, assuming that both the power transistor 30 and the reference transistor 52 are closed, a slave current $I_{slave}$ will flow through the power transistor 30, and a reference current $I_{ref}$ will flow through the reference transistor 52. The voltage $v_{node}$ at the node 58 is given by $V_{node} = V_{in} - (R_R \times I_{ref})$ where $R_R$ is the equivalent resistance of the transistor 52, whereas the voltage $V_{int}$ at the intermediate terminal 26 is given by $V_{int} = V_{in} - (R_P \times I_{slave})$ where $R_P$ is the resistance of the power transistor 30. Since the reference transistor 52 is fabricated with a single transistor element, whereas the power transistor is fabricated with N transistor elements, the resistance $R_P$ of the power transistor will be substantially equal to 1/N times the resistance $R_R$ of the reference transistor 52, and $V_{node} = V_{in} - (R_P \times N \times I_{ref})$ consequently, the node voltage $V_{node}$ will be greater than the intermediate voltage $V_{int}$ if the slave current $I_{slave}$ is greater than $N_X I_{ref}$. Therefore, current sensor 40 will output a high signal on output line 44c if the slave current $I_{slave}$ is greater than a threshold current $N \times I_{ref}$, whereas it will output a low signal on reference line 44c if the slave current $I_{slave}$ is lower than the threshold current $N \times I_{ref}$.

The two current sensors 40 and 42 may be constructed with different reference currents $I_{ref}$ to provide different threshold currents $T_{pcross}$ and $T_{ncross}$. A first threshold current $T_{pcross}$ for the first current sensor 40 may be larger than a second threshold current $T_{ncross}$ for the second current sensor 42. Thus, current sensor 40 will output a high signal on the first output line 44c if the slave current $I_{slave}$ is greater than the threshold current $T_{pcross}$ and will output a low signal if the slave current $I_{slave}$ is less than the threshold current $T_{pcross}$. Similarly, current sensor 42 will output a high signal on output line 44d if the slave current $I_{slave}$ is greater than the threshold current $T_{ncross}$, and will output a low signal if the slave current $I_{slave}$ is less than the threshold current $T_{ncross}$. These simple threshold output signals provide information about the current passing through the slave to the master controller 18, are less susceptible to noise than analog signals, and consume less power and avoid the large number interconnects that would be result from a full analog-to-digital conversion of the current.

The current thresholds $T_{ncross}$ and $T_{pcross}$ are selected so that the slave current $I_{slave}$ crosses at least one of the thresholds each switching cycle, i.e., each PMOS and NMOS conduction state. The threshold current $T_{pcross}$ should be higher than the threshold current $T_{ncross}$ to increase the likelihood that the slave current $I_{slave}$ will cross the threshold occurs after the comparator is enabled. In one embodiment, the first threshold current $T_{pcross}$ may be about 8 amps, whereas the second threshold current $T_{ncross}$ may be about 2 amps.

The current sensors can be configured to output more than one digital signal. For example, the current sensor can generate a first digital signal if the slave current $I_{slave}$ exceeds a first threshold current $T_{pcross1}$, a second digital signal if the slave current $I_{slave}$ exceeds a second threshold current $T_{pcross2}$, etc.

Returning to FIG. 1, as previously discussed, the output voltage $V_{out}$ at the output terminal 22 is regulated, or maintained at a substantially constant level, by the master controller 18. The master controller 18 measures the voltage at the output terminal 22 and receives the digital output signals on the output lines 44c and 44d from the current sensors 40 and 42 of each slave 16. In response to the measured output voltage $V_{out}$ and the output signals from the current sensors, the master controller 18 generates control signals to control the operation of the first and second transistors 30, 32 in each slave 16. The operation of master controller 18 will be described in more detail below.

The master controller 18 and the slaves 16 may be constructed utilizing mostly digital and switched-capacitor based components. Thus, most of the switching regulator 10 could be implemented or fabricated on a single chip utilizing conventional CMOS techniques. However, it is preferred for each slave 16 to be fabricated on a single chip and for the master controller 18 to be fabricated on a separate chip. Alternately, each slave could be fabricated on a single IC, the voltage sensor could be fabricated on a separate IC chip, and the remainder of the digital controller could be fabricated on yet another IC chip. Each chip may be fabricated utilizing conventional CMOS techniques.

Referring to FIG. 3, master controller 18 includes a voltage sampling circuit 60 which measures the output voltage $V_{out}$ at the output terminal 22 at one or more discrete times during each cycle of the switching circuit. The sampling circuit 60 may be constructed substantially as described in U.S. application Ser. No. 08/991,394, by Anthony J. Stratakos et al., filed Dec. 16, 1997, entitled DISCRETE-TIME SAMPLING OF DATA FOR USE IN SWITCHING REGULATORS, and assigned to the assignee of the present invention, the entire disclosure of which is incorporated herein by reference. The ground for the sampling circuit 60 may be connected directly to the ground of the microprocessor to reduce errors caused by parasitic capacitance and inductance. The voltage sampled by sampling circuit 60 is converted into a digital voltage signal by an analog-to-digital (A/D) converter 62.

The master controller 18 also includes a digital control algorithm 64. The digital control algorithm receives the digital voltage signal from the A/D converter 62, the output signals $c_1, c_2, \ldots c_n$ and $d_1, d_2, \ldots, d_n$ from the output lines 44c and 44d, and a clock signal 66 from an external clock. The clock signal 66 may be generated by the same clock that runs the microprocessor, by other IC devices in the load, or by a clock on the master controller chip. The clock frequency $f_{clock}$ should be significantly larger than the switching frequency $f_{switch}$ of the switching circuit 24, e.g., by a factor of ten to one-hundred, to ensure quick response to changes in the load. However, the clock frequency $f_{clock}$ should not be so high that the switching regulator and master controller constitute a large drain on the voltage source. Typically, the clock frequency $f_{clock}$ does not to be as high as the microprocessor clock speed, and can be generated by dividing down the microprocessor clock signal. The clock signal 66 may have a frequency $f_{clock}$ between about 16 and 66 MHz, e.g., about 33 MHz.

Referring to FIG. 3A, another implementation of the master controller 18' includes a voltage sampling and holding circuit 60' connected to the output terminal 24 to measure the difference between the output voltage and the nominal voltage, i.e., $V_{out[n]}-V_{nom}$, and the difference between the present output voltage and the output voltage in the previous clock cycle, i.e., $V_{out[n]}-V_{out[n-1]}$. A digital nominal voltage $V_{nom}$ may be set by external pins and converted into an analog voltage by a digital-to-analog (D/A) converter 68. In this implementation, the voltage differences sampled by the sampling circuit 60' is converted into two digital voltage difference signals by two A/D converters 62'. The smaller range of conversion required for the voltage differences (as compared to the A/D converter 60') permits the use of simpler and faster A/D converters. The digital control algorithm receives the digital voltage difference signals from the A/D converters 62', the output signals $c_1, c_2, \ldots c_n$ and $d_1, d_2, \ldots d_n$ from the output lines 44c and 44d, the clock signal 66 from an external clock, the digital nominal voltage $V_{nom}$, and the current limit signals on the current limit line $44_h$ (discussed below with reference to FIG. 1A).

Returning to FIGS. 1 and 3, the digital control algorithm 64 generates a set of control signals $a_1, a_2, \ldots, a_n$, and $b_1, b_2, \ldots, b_n$ on the timing lines 44a and 44b to control the transistors 30 and 32 in each slave 16. Based on the current load, the digital control algorithm 64 determines the switching state of each slave, i.e., PMOS transistor 30 closed and NMOS transistor 32 open, NMOS transistor 32 closed and PMOS transistor 30 open, or both PMOS transistor 30 and NMOS transistor 32 open, so as to maintain the output voltage $V_{out}$ at the output terminal 22 substantially within the voltage tolerance $\Delta V_{nom}$ of the nominal voltage $V_{nom}$.

Alternately, referring to FIGS. 1A, 3A and 13A, the master controller 18' may generate one or more digital state control signals which are interpreted by an on-chip interpreter 48 in each slave 16' to generate the control signals on control lines 44a' and 44b'. As illustrated, the master controller 18' generates PMOS state control signals $e_1, e_2, \ldots, e_N$ on state control line 44e, NMOS state control signals $f_1, f_2, \ldots, f_N$ on state control lines 44f, and continuos/ discontinuous mode operation control signals $h_1, h_2, \ldots, h_N$ on state control lines 44*h*. Specifically, when the slave is to be switched to a PMOS conduction state, the master controller outputs a pulse 49*a* on the PMOS state control line 44*e*. On the other hand, when the slave is to be switched to an NMOS conduction state, the master controller 18' outputs a pulse 49*b* on the NMOS state control line 44*f*. The on-chip interpreter 48 interprets the rising edge of the pulse 49*a* on state control line 44*e* as a command to switch the slave 16 to the PMOS state, e.g., by setting control line 44*a*' high and setting control line 44*b*' low. Conversely, the rising edge of the pulse 49*b* on state control line 44*f* is interpreted by the on-chip interpreter 48 as a command to switch the slave 16 to the NMOS state, e.g., by setting control line 44*a*' low and setting control line 44*b*' high. The on-chip interpreter can interpret the falling edges of the pulses on state control lines 44*e* and 44*f* as commands to enable the comparators 56 in the current sensors 40 and 42, respectively.

If continuous mode operation is enabled (e.g., the control line 44*g* is low), then the switching circuit will operate normally when the slave current $I_{slave}$ is negative. However, if the NMOS transistor 30 is closed, and if discontinuous mode operation control signal is disabled (e.g., the control line 44*g* is high), then both the NMOS transistor 30 and the PMOS transistor 32 will be opened if the slave current $I_{slave}$ falls below zero, so as to prevent negative current from flowing through the slave. In general, the master controller 18 causes the slaves to operate in the discontinuous mode, as this is more efficient. However, it may be advantageous to operate in the continues mode if there is a large and swift drop in the load.

The slaves may also include an fault protection circuit 68 that automatically shuts down the slave (overriding the control signals from the master controller) if the current passing through the switching circuit exceeds a dangerous level, e.g., 15 amps. If the fault protection circuit 68 is activated, the slave may send a digital signal on a current limit lines 44*i* (see FIG. 3A) to inform the master controller 18' that the slave has been deactivated. The slaves may generate other digital feedback signals. For example, the slave may include a state sensor to generate a digital state signal indicating the state of the switching regulator, e.g., in the PMOS or NMOS conduction state.

Referring to FIG. 4, each clock cycle $T_{clock}$, e.g., about every 30 nanoseconds if the clock frequency $f_{clock}$ is about 33 MHz, the digital control algorithm 64 may perform a control method 100. The control algorithm 64 determines an estimated current $I_{estimate}$ for each slave which represents the current flowing through the inductor 34 in that slave (step 102). Control algorithm 64 also calculates a desired voltage $V_{des}$ which represents the target output voltage on output terminal 22 (step 104), and calculates a desired total current $I_{total}$ which represents the current which should be flowing to the load through the inductor so that the output voltage $V_{out}$ is substantially equal to the desired voltage $V_{des}$ (step 106). Next, the digital control algorithm determines the desired number of slaves to be activated in the next clock cycle (step 108) and calculates a desired current $I_{des}$ for each slave (step 110). Finally, the control algorithm controls the first and second transistors 30 and 32 of each slave so that the total current flowing through the slaves is substantially equal, e.g., within a desired current error $\Delta I_{total}$, to the desired total current $I_{total}$ (step 112). Each of these steps will be explained in greater detail below. However, it should be realized that the steps need not be performed in the order specified. For example, various calculations can be performed in parallel or performed in a previous clock cycle and stored. Specifically, the desired voltage and desired current may be calculated and stored for use in the next clock cycle.

Referring to FIGS. 1 and 5, the estimated current $I_{estimate}$ is calculated in step 102. The rate of change of a current passing through an inductor, i.e., dI/dT, is proportional to the voltage across the inductor, $V_{inductor}$, so that $$V_{inductor} = L\frac{dI}{dT} \tag{1}$$

where L is the inductance of the inductor for a current flowing from the intermediate terminal 26 to the output terminal 22. During the PMOS conduction state, the intermediate terminal 26 is connected to the input voltage source and the voltage $V_{inductor}$ across the inductor 34, i.e., $V_{out} - V_{intermediate}$, is positive, thereby causing the current through the inductor to increase. On the other hand, during the NMOS conduction state, the intermediate terminal 26 is connected to ground so that the voltage $V_{inductor}$ across the inductor 34 is negative, thereby causing the current through the inductor to decrease. During the PMOS conduction state, the slope of the slave current $I_{slave}$ (shown by phantom line 70) is given by $$\frac{dI}{dT} = \frac{V_{in} - V_{out}}{L} \tag{2}$$

whereas during the NMOS conduction state, the slope of the slave current $I_{slave}$ is given by $$\frac{dI}{dT} = \frac{-V_{out}}{L} \tag{3}$$

The estimated current $I_{estimate}$ (shown by solid line 72) is adjusted every clock cycle. Specifically, during the PMOS conduction state, the estimated current $I_{estimate}$ is incremented by a ramp-up value $\Delta I_{up}$ each clock cycle. Similarly, during the NMOS conduction state, the estimated current $I_{estimate}$ is decremented by a ramp-down value $\Delta I_{down}$ each clock cycle. The ramp-up and ramp-down values $\Delta I_{up}$ and $\Delta I_{down}$ may be given by $$\Delta I_{up} = \frac{V_{in} - V_{out}}{L \cdot f_{clock}} \quad \Delta I_{down} = \frac{V_{out}}{L \cdot f_{clock}} \tag{4}$$

where L is the inductance of the inductor 34 and $f_{clock}$ is the clock frequency.

Nominal values may be used for the variables in the determination of $\Delta I_{up}$ and $\Delta I_{down}$, so that the ramp-up and ramp-down rates do not change during operation of the switching regulator. Alternately, one or more of the values of $V_{in}$, $V_{out}$, $f_{clock}$ and L may be measured and used for recalculation of $\Delta I_{up}$ and $\Delta I_{down}$ to provide dynamic adjustment of the ramp-up and ramp-down rates during the operation of the switching regulator 10. Unfortunately, the inductance L and the input current $V_{in}$ are not known exactly and can change over time or vary from circuit to circuit. Thus, the estimated current $I_{estimate}$ will depart from the actual slave current $I_{slave}$. Consequently, it is necessary to occasionally check the estimated current $I_{estimate}$ against the actual slave current $I_{slave}$. Each clock cycle, the estimated current $I_{estimate}$ for the slave is checked against the output signals from the current sensor 40 and 42. If the estimate disagrees with the measurement, then the estimate is adjusted to match.

Referring to FIGS. 6A and 7A, during the PMOS conduction state, if the estimated current $I_{estimate}$ is below the upper threshold current $I_{pcross}$ but the output signal $c_1$ from current sensor 40 is high, the estimated current is increased to match $I_{pcross}$. Referring to FIGS. 6B and 7B, if the estimated current $I_{estimate}$ exceeds the upper threshold current $I_{pcross}$ but the output signal $c_1$ is low, the estimated current $I_{estimate}$ will be held at $I_{pcross}$ until the output signal $c_1$ goes high. Referring to FIGS. 6C and 7C, during the NMOS conduction state, if the estimated current $I_{estimate}$ is above the lower threshold current $I_{ncross}$ but the output signal $d_1$ from current sensor 42 is low, the estimated current $I_{estimate}$ is immediately decreased to match $I_{ncross}$. Referring to FIGS. 6D and 7D, if the estimated current $I_{estimate}$ would fall below the lower threshold current $I_{ncross}$ but the output signal $d_1$ is high, the estimated current $I_{estimate}$ will be held at $I_{ncross}$ until the output signal $d_1$ goes low. The calculation of the estimated current $I_{estimate}$ is summarized in Table 1.

TABLE 1

| | | | |
|---|---|---|---|
| PMOS conduction state | $I_{estimate} > I_{pcross}$ | $c_1$ high | increment $I_{estimate}$ by $\Delta I_{up}$ |
| | | $c_1$ low | hold $I_{estimate}$ at $I_{pcross}$ |
| | $I_{estimate} < I_{pcross}$ | $c_1$ high | increase $I_{estimate}$ to $I_{pcross}$ |
| | | $c_1$ low | increment $I_{estimate}$ by $\Delta I_{up}$ |
| NMOS conduction state | $I_{estimate} > I_{ncross}$ | $d_1$ high | decrement $I_{estimate}$ by $\Delta I_{up}$ |
| | | $d_1$ low | decrease $I_{estimate}$ to $I_{ncross}$ |
| | $I_{estimate} < I_{ncross}$ | $d_1$ high | hold $I_{estimate}$ at $I_{ncross}$ |
| | | $d_1$ low | decrement $I_{estimate}$ by $\Delta I_{up}$ |

The digital control algorithm may ignore the signals from the current sensors in one or more clock cycles immediately after switching between the PMOS and NMOS conduction states to prevent spurious signals from accidentally adjusting the estimated current.

A delay time $\Delta T_{delay}$ created by the switching time required to trip the comparator and the propagation time required for a signal to travel along the output line 44c or 44d may be factored into the determination of the estimated current. For example, if the estimated current $I_{estimate}$ is corrected when the output signal c1 switches from low to high, a correction factor $\Delta T_{delay} \times \Delta I_{up} \times f_{switch}$ is added to the estimated current to represent the actual current when then master controller receives the change in the output signal c1. Similarly, if the estimated current $I_{estimate}$ is corrected when the output signal d1 switches from high to low, a correction factor $\Delta T_{delay} \times \Delta I_{down} \times f_{switch}$ is subtracted from the estimated current. Alternately, the threshold current $I_{pcross}$ may be decreased by a correction factor $\Delta T_{delay} \times \Delta I_{up} \times f_{switch}$ and the threshold current $I_{ncross}$ may be increased by a correction factor $\Delta T_{delay} \times \Delta I_{down} \times f_{switch}$ (while maintaining the original values of $I_{pcross}$ and $I_{ncross}$ used in Table 1) for the same effect.

Referring to FIG. 8, the desired voltage $V_{desired}$ is selected in step 104 to improve the likelihood that the output voltage $V_{out}$ will remain within the voltage tolerance $\Delta V_{nom}$ of the nominal voltage $V_{nom}$. The effect of changes in the load on the output voltage $V_{out}$ is illustrated by phantom line 80. Specifically, when the load suddenly increases, current flows out of the capacitor 36 and into load 14, thereby decreasing the output voltage $V_{out}$. Conversely, when the load on the switching regulator suddenly decreases, charge accumulates on the capacitor 36, thereby increasing the output voltage $V_{out}$. This causes the output voltage $V_{out}$ to exceed the tolerance voltage, e.g., by an excess voltage $\Delta V_{excess}$.

The controller 18 selects a desired voltage $V_{desired}$ in order to decrease or eliminate the excess voltage $\Delta V_{excess}$. When the load on the switching regulator is at a minimum, the load can only be increased, and therefore the output voltage $V_{out}$ can only decrease. Conversely, when the load on the switching regulator is at a maximum, the load can only decrease, and therefore the output voltage $V_{out}$ can only increase. When the load is low, the desired voltage $V_{desired}$ can be set to be slightly greater than the nominal voltage $V_{nom}$. When the load is high, the desired voltage $V_{desired}$ may be set to be slightly less than the nominal voltage $V_{nom}$. As shown by solid line 82, this technique reduces the excess voltage $\Delta V_{excess}$ thereby improving the likelihood that the output voltage $V_{out}$ will remain within the designated voltage tolerance $\Delta V_{nom}$ of the nominal voltage $V_{nom}$. Thus, for a given load, the switching regulator can use smaller capacitors and maintain the same voltage tolerance. The desired voltage $V_{desired[n+1]}$ for clock cycle n+1 may be calculated as follows:

$$V_{desired[n+1]} = c_1 V_{nom} + c_2(V_{nom} - V_{desired[n]}) + (c_1 + c_2)\left(1 - 2\frac{I_{load}}{I_{max}}\right) \cdot \Delta V_{swing} \quad (5)$$

where load is the current passing through the load 14 (computed from Equation 8 below), $I_{max}$ is the maximum current permitted through the load 14, $c_1$ and $c_2$ are feedback constants, and $\Delta V_{swing}$ is the change in voltage permitted by the voltage tolerance, i.e., $\Delta V_{swing} < \Delta V_{nom}$. For example, if the nominal voltage $V_{nom}$ is 1.3 volts and the voltage tolerance is +/−6%, then $\Delta V_{nom}$ will be about 78 millivolts and $\Delta V_{swing}$ may be approximately 30 millivolts, c1 may be about 1.0, and c2 may be about −0.9375.

Once the desired voltage $V_{desired}$ has been determined in step 104, the desired total current $I_{total}$ is determined in step 106. Specifically, the desired current $I_{total}$ is set so as to maintain the output voltage $V_{out}$ at the output terminal 22 at the desired voltage $V_{desired}$. In general, assuming that the output voltage $V_{out}$ is equal to the desired voltage $V_{desired}$, the total current passing through the inductors to the load should equal the current through the load, i.e., $I_{total} = I_{load}$. However, if the voltage $V_{out}$ differs from the desired voltage $V_{desired}$, then the current flowing through the switching regulator 10 may be adjusted to correct for this voltage error. Thus, the desired total current $I_{total}$ may be expressed as $$I_{total} = I_{load} + I_{adjust} \quad (6)$$

where $I_{adjust}$ is an adjustment factor to correct for voltage error.

Referring to FIG. 9, assuming all the capacitors connected to the output terminal are in the slaves, the load current $I_{load}$ is equal to the sum of the output current $I_{out}(i)$ from each slave 16, i.e., $$I_{load} = \sum_{1}^{N} I_{out}(i) \quad (7)$$

The output current $I_{out}(i)$ of each slave 16 is equal to the difference between the current flowing through the inductor 34, i.e., the slave current $I_{slave}(i)$, and the current flowing into or out of the capacitor 36, i.e., a capacitor current $I_{cap}(i)$, so that $$I_{out}(i) = I_{slave}(i) - I_{cap}(i) \quad (8)$$

Therefore, in this configuration, the desired total current $I_{total}$ may be expressed by $$I_{total} = \sum_{1}^{N} I_{slave}(i) - \sum_{1}^{N} I_{cap}(i) + I_{adjust} \quad (9)$$

The slave currents $I_{slave}(i)$ are not known exactly, but may be approximated as the sum of the estimated current $I_{estimate}$ from each slave. In addition, the capacitor currents $I_{cap}(i)$ are not known, and the capacitors in the slaves may be supplemented or replaced by one or more capacitors, such as microprocessor bypass capacitors, connected to a common line from the inductors 34. However, in general, if the output voltage $V_{out}$ is changing, then current must be flowing into or out of the capacitors 36. Consequently, the total capacitor current $I_{CAP}$ may be expressed by $$I_{CAP} = C \cdot \frac{\Delta V_{out}}{\Delta T} \quad (10)$$

where C is the total capacitance of the capacitors connected between the output terminal and ground, $\Delta T$ is the clock period, and $\Delta V_{out}$ is the change in the output voltage over the clock period. Thus, the load current $I_{load}$ may generally be determined from $$I_{load} = \sum_{1}^{N} I_{estimate}(i) - \frac{\Delta V_{out}}{\Delta T} \cdot C \quad (11)$$

In the implementation shown in FIG. 3, the calculation of $\Delta V_{out}$, i.e. $V_{out[n]} - V_{out[n-1]}$, may be performed by the digital control algorithm 64, whereas in the implementation shown in FIG. 3A, the voltage difference $V_{out[n]} - V_{out[n-1]}$ is provided by the sampling and holding circuit 60'.

The adjustment current, $I_{adjust}$, may be linearly proportion to the difference between the measured output voltage $V_{out}$ and the desired voltage $V_{desired}$. Therefore, the desired total current $I_{total}$ may be calculated as follows:

$$I_{total} = \sum_{1}^{N} I_{estimate}(i) - \frac{\Delta V_{out}}{\Delta T} \cdot C + K(V_{out} - V_{desired}) \quad (12)$$

where K is a feedback constant that determines the adjustment current $I_{adjust}$.

Once the total desired current $I_{total}$ has been determined, the controller 18 determines how many slaves should be active in step 108. The number of slaves for the current cycle can be computed in a previous clock cycle. In general, the number of active slaves will be proportional to the desired total current. For example, if the maximum average current through each slave 16 is about 7 amps, then one slave may be active if the $I_{total}$ is between 0 and 7 amps, two slaves will be active if $I_{total}$ is between 7 and 14 amps, etc. More particularly, the number of active slaves may be given by Table 2.

TABLE 2

| Number of Active Slaves for Clock Cycle N | Total Current $I_{total}$ (amps) Number of Active Slaves for clock cycle N + 1 | | | | |
|---|---|---|---|---|---|
| 1 | $0 > I_{total} \geq 7$ <br> 1 | $7 > I_{total} \geq 14$ <br> 2 | $14 \geq I_{total} > 21$ <br> 3 | $21 \geq I_{total} > 28$ <br> 4 | $28 > I_{total}$ <br> 5 |
| 2 | $0 > I_{total} \geq 6$ <br> 1 | $6 > I_{total} \geq 14$ <br> 2 | $14 \geq I_{total} > 21$ <br> 3 | $21 \geq I_{total} > 28$ <br> 4 | $28 > I_{total}$ <br> 5 |
| 3 | $0 > I_{total} \geq 6$ <br> 1 | $6 > I_{total} \geq 12$ <br> 2 | $12 \geq I_{total} > 21$ <br> 3 | $21 \geq I_{total} > 28$ <br> 4 | $28 > I_{total}$ <br> 5 |
| 4 | $0 > I_{total} \geq 6$ <br> 1 | $6 > I_{total} \geq 12$ <br> 2 | $12 \geq I_{total} > 18$ <br> 3 | $18 \geq I_{total} > 28$ <br> 4 | $28 > I_{total}$ <br> 5 |
| 5 | $0 > I_{total} \geq 6$ <br> 1 | $6 > I_{total} \geq 12$ <br> 2 | $12 \geq I_{total} > 18$ <br> 3 | $18 \geq I_{total} > 24$ <br> 4 | $24 > I_{total}$ <br> 5 |

Once the desired total current $I_{total}$ and the number of active slaves have been determined, the desired voltage $I_{desired}$ may be calculated for each slave in step 110. Specifically, the desired voltage $I_{desired}$ may simply be the total current $I_{total}$ divided by the number of active slaves.

Once the desired current $I_{desired}$ has been calculated for each active slave, the switching circuit in each active slave is controlled (step 112) so that the average current passing through the active slave is substantially equal to the desired current $I_{desired}$ and the total current passing through the switching regulator is substantially equal to $I_{total}$. Thus, the current flowing out of the switching regulator 10 matches the current flowing into the load 12, thereby maintaining the output voltage at the desired voltage $V_{desired}$. The remaining, i.e., inactive, slaves are disconnected, i.e., both the PMOS transistor 30 and the NMOS transistor 32 are left open.

A variety of control algorithms are possible to control the switching circuits of the active slaves so that the total current passing through the switching regulator is substantially equal to the desired total current $I_{total}$. In general, the control algorithm is selected to balance the following factors: 1) enabling all the slaves to switch on or off simultaneously for quick response to changes in the load, 2) ensuring that the slaves operate at the desired phase offsets to minimize voltage ripple, 3) maintaining the average current equal to the desired current to maintain the voltage at a substantially constant level, and 4) switching at a desired switching frequency.

Referring to FIG. 10, one of the active slaves is selected as a reference slave (step 120), e.g., based on a predetermined selection pattern. For example, a specific slave may be designated as the reference slave, or the reference slave may rotate through the slaves. As discussed below, the behavior of the remaining slaves, i.e., the non-reference slaves, is tied to the behavior of the reference slave. The reference slave may be selected at power-up of the switching regulator, or each time that the number of active slaves changes. Once the reference slave is selected, a desired phase offset is calculated for each non-reference slave (step 122). The desired phase offsets may be determined each time that the number of active slaves changes. The non-reference slaves will be controlled to operate at the desired phase offsets.

Each clock cycle, two current limits, including an upper current limit $I_{upper}$ and a lower current limit $I_{lower}$, are calculated for the reference slave (step 124). Finally, the reference slave is controlled based a reference slave control algorithm (step 126) and the non-reference slaves are controlled based on a non-reference slave control algorithm (step 128). In several implementations, the reference slave is controlled based on a comparison of the estimated current $I_{estimate}$ to the upper and lower current limits $I_{upper}$ and $I_{lower}$, and the non-reference slaves are controlled based on the desired phase offset. Of course, the ordering of the steps shown in FIG. 10 is exemplary, and the steps could be performed in parallel in another order. For example, in any particular clock cycle, the current limits could be calculated before the phase offsets, and the calculation steps could occur after the control steps if the slaves are controlled based on current limits and phase offsets calculated and stored in prior clock cycles.

In step 122, for each non-reference slave, the control algorithm calculates a desired phase offset $\Phi(i)$ representing the desired time delay in the onset of the PMOS and NMOS conduction states between the reference and non-reference slaves. For example, if two slaves are active, then they should be 180° out of phase, and the time delay should be equal to one-half of the switching period T, i.e., $\Phi(1)=\frac{1}{2}T$. If three slaves are active, then they should be 120° out of phase, and the time delays $\Phi(1)$, $\Phi(2)$ should be equal to one-third and two-thirds of the switching period, respectively. By operating the slaves out of phase, the current ripples from each slave will at least partially cancel, thereby providing a more constant output current from the switching regulator. The desired phase offsets are summarized by Table 3.

TABLE 3

| Desired phase offset | Number of active slaves | | | | |
|---|---|---|---|---|---|
| | 1 | 2 | 3 | 4 | 5 |
| $\Phi(0)$ [reference] | 0 | 0 | 0 | 0 | 0 |
| $\Phi(1)$ | | ½ T | ⅓ T | ¼ T | ⅕ T |
| $\Phi(2)$ | | | ⅔ T | ½ T | ⅖ T |
| $\Phi(3)$ | | | | ¾ T | ⅗ T |
| $\Phi(4)$ | | | | | ⅘ T |

The upper and lower current limits $I_{upper}$ and $I_{lower}$ are calculated for the reference slave in step 124 so that the average current through the reference slave 16 is equal to the desired current $I_{desired}$. Specifically, the upper current limit $I_{upper}$ and $I_{lower}$ current limit $I_{lower}$ are calculated as follows:

$$I_{upper}=I_{desired}+\frac{1}{2}\Delta I_0 \quad I_{lower}=I_{desired}-\frac{1}{2}\Delta I_0 \tag{13}$$

where $\Delta I_0$ is bandwidth of the reference slave. The bandwidth $\Delta I_0$ is set based on the desired switching frequency, as follows:

$$\Delta I_0 = \frac{1}{\left(\frac{L}{V_{in}-V_{out}}+\frac{L}{V_{out}}\right)} \cdot \frac{1}{f_{switch}} \tag{14}$$

where $f_{switch}$ is the desired switching frequency. The desired switching frequency is selected to provide good dynamic response while maintaining adequate power efficiency. In general, increasing the switching frequency reduces the current ripple but makes the switching regulator more inefficient. Conversely, decreasing the switching frequency improves the power efficiency of the switching regulator but increases the current ripple. The switching frequency should be in the range of about 0.5 to 5.0 MHz, e.g., about 1 MHz. The bandwidth calculation to provide the desired switching frequency may be based on either measured or nominal values of the other variables in Equation 14.

One implementation of the basic operation of the master controller 18 in controlling the reference slave will be explained with reference to FIGS. 11–12. As previously noted, the master controller 18 calculates an estimated current $I_{estimate}$ (shown by solid line 70) in step 102. The master controller 18 also calculates an upper current limit $I_{upper}$ (shown by solid line 72) and a lower current limit $I_{lower}$ (shown by solid line 74) in step 122. Digital control algorithm 64 compares the estimated current $I_{estimate}$ of the reference slave to the upper and lower limits $I_{upper}$ and $I_{lower}$ to determine whether to switch the first and second transistors 30 and 32. Specifically, when the estimated current $I_{estimate}$ exceeds the upper current limit $I_{upper}$, the NMOS transistor 32 is closed and the PMOS transistor 30 is opened, thereby connecting the intermediate terminal 6 to ground. On the other hand, when the estimated current $I_{estimate}$ falls below the lower current limit $I_{lower}$, the NMOS transistor 32 is opened and the PMOS transistor 30 is closed, thereby connecting the intermediate terminal 26 to the input voltage source 12. Consequently, assuming that the estimated current $I_{estimate}$ accurately represents the current $I_{slave}$ passing though the reference slave, the reference slave current $I_{slave}$ (shown by phantom line 76) oscillates between the upper and lower limits $I_{upper}$ and $I_{lower}$, and the average current reference slave current is approximately equal to the desired current $I_{desired}$ (shown by phantom line 78).

In the switching regulator 10' shown in FIG. 1A, when the estimated current $I_{estimate}$ exceeds the upper current limit $I_{upper}$, the master controller 18' outputs a pulse 49b on state control line 44f. This pulse is interpreted by the on-chip interpreter 48 as a command to open the PMOS transistor 30 (shown by the control line control line 44a going low in FIG. 13A) and close the NMOS transistor 32. On the other hand, when the estimated current $I_{estimate}$ falls below the lower current limit $I_{lower}$, the master controller outputs a pulse 49a on state control line 44e which causes the NMOS transistor 32 to open and the PMOS transistor 30 to close (shown by control line 44a going high in FIG. 13A).

The upper and lower current limits $I_{upper}$ and $I_{lower}$ are used to control the switching circuit 24 to ensure that the average current flowing out of the reference slave matches the desired current. For example, if the load increases, then $I_{desired}$ is increased and the current limits $I_{upper}$ and $I_{lower}$ are increased. On the other hand if the load decreases, then $I_{desired}$ is decreased and the current limits $I_{upper}$ and $I_{lower}$ are decreased. In addition, when the load is substantially constant, the bandwidth $\Delta I_0$ between the upper and lower current limits $I_{upper}$ and $I_{lower}$ sets the switching frequency of the switching circuit 24.

A variety of control algorithms are possible to control the switching circuits of the non-reference slaves in order to achieve the desired current and phase offset. Referring to FIG. 14 and 15, in one implementation of the digital control algorithm 64, the non-reference slaves are controlled based on one of the current limits and the switching time of the one of the transistors in the reference slave. In brief, switching of the non-reference slaves is triggered by two events: when the estimated current for the slave passes one of the current limits, and expiration of a phase offset timer that starts when the reference slave switches due to the other current limit.

Specifically, when the estimated current $I_{estimate}$ of the non-reference slave exceeds the upper current limit $I_{upper}$ (calculated in Equation 12 for the reference slave), that non-reference slave commences its NMOS conduction state, i.e., the PMOS transistor 30 is opened and the NMOS transistor 32 is closed. The digital control algorithm can include one or more phase offset timers. The phase offset timer is used to trigger the PMOS conduction state of the non-reference slaves. Specifically, the timer is started when the reference slave commences its PMOS conduction state. Each clock cycle, the timer is compared to the desired phase offset $\Phi(i)$ of each non-reference slave. When the offset time $\Phi(i)$ associated with a particular non-reference slave has expired, that non-reference slave commences its PMOS conduction state, i.e., the NMOS transistor 32 is opened and the PMOS transistor 30 is closed. Thus, the phase offset (i) determines the delay between the reference and non-reference slaves in the onset of the NMOS conduction states. Of course, the triggering scheme could be reversed, with the PMOS conduction state triggered when the non-reference slave falls below the lower current limit $I_{lower}$, and the timers activated when the reference slave commences its NMOS conduction state.

Referring to FIG. 16 and 17, in a second implementation of the digital control algorithm 64, upper and lower current limits $I_{upper}(i)$ and $I_{lower}(i)$ are calculated for each non-reference slave. The upper and lower current limits are selected so that the average current through the non-reference slave 16 is equal to the desired current $I_{desired}$. Since each slave has its own current limits, the bandwidth $\Delta I_i$ of each slave controls the switching frequency for that slave. Specifically, the switching period T may be calculated from the following equation:

$$T = \Delta I_i \cdot \left( \frac{L}{V_{in} - V_{out}} - \frac{L}{V_{out}} \right) \quad (15)$$

In order to adjust the phase difference between the reference and non-reference slaves, the bandwidth $\Delta I_i$ of the non-reference slave is adjusted to change its switching frequency. This slows or speeds the non-reference slave relative to the reference slave, thereby modifying the time difference between the PMOS and NMOS conduction states. Once the desired phase difference has been achieved, the bandwidth of the non-reference slave is adjusted again so that the switching frequencies of the two slaves match. To adjust the bandwidth of the non-reference slave, digital control algorithm 64 measures the actual time delay $T_N$ and $T_P$ between the onset of the NMOS and PMOS conduction states of the two slaves. Then the bandwidth $\Delta I_i$ is set equal to the desired bandwidth, plus a feedback term that is proportional to the error or difference between the desired and actual time delays. For example, the bandwidth $\Delta I_i$ may be calculated as follows:

$$\Delta I_i = \Delta I_0 + K_1[\Phi(i) - T_N] + K_2[\Phi(i) - T_P] \quad (16)$$

where $K_1$ and $K_2$ are feedback error constants and $\Delta I_0$ is the desired bandwidth calculated in Equation 13. Then the upper current limit $I_{upper}(i)$ and lower current limit $I_{lower}(i)$ are calculated as follows:

$$I_{upper}(i) = I_{desired}(i) + \tfrac{1}{2}\Delta I_i \quad I_{lower}(i) = I_{desired}(i) - \tfrac{1}{2}\Delta I_i \quad (17)$$

The upper and lower limits $I_{upper}(i)$ and $I_{lower}(i)$ are used to trigger the first and second transistors 30 and 32 of the non-reference slaves. Specifically, when the estimated current $I_{estimate}(i)$ exceeds the upper current limit $I_{upper}(i)$, the PMOS transistor 30 is opened and the NMOS transistor 32 is closed. On the other hand, when the estimated current $I_{estimate}(i)$ falls below the lower current limit $I_{lower}(i)$, the NMOS transistor 32 is opened and the PMOS transistor 30 is closed. Consequently, assuming that the estimated current $I_{estimate}(i)$ accurately represents the current $I_{slave}(i)$ passing though the slave, the slave current $I_{slave}(i)$ oscillates between the upper and lower limits $I_{upper}(i)$ and $I_{lower}(i)$. Thus, the average current passing through the slave is approximately equal to $I_{desired}(i)$, and the total current passing through the switching regulator is approximately equal to the desired total current $I_{total}$. The upper and lower current limits are set so that the average total output current from the slaves matches the load.

Referring to FIGS. 18–23, in a third implementation, the digital control algorithm 64 calculates a "ghost" current for each non-reference slave 16. The ghost current $I_{ghost}(i)$ represents a desired current flowing through that slave, given the current limits and the desired phase offset. Each non-reference slave is controlled by comparing the estimated current $I_{estimate}(i)$ for the non-reference slave to the ghost current $I_{ghost}(i)$.

The ghost current may be calculated in a fashion similar to the calculation of the estimated current: during the ghost PMOS conduction state the ghost current $I_{ghost}(i)$ (shown by solid line 84 in FIG. 22) is incremented by a ramp-up value $\Delta I_{up-ghost}$ each clock cycle, and during the ghost NMOS conduction state the ghost current $I_{ghost}(i)$ is decremented by the ramp-down value $\Delta I_{down-ghost}$ each clock cycle. However, if the ghost current $I_{ghost}(i)$ would exceed the upper current limit $I_{upper}$, then the ghost current is set equal to the upper current limit $I_{upper}$. Similarly, if the ghost current $I_{ghost}(i)$ would fall below the lower current limit $I_{lower}$, then the ghost current is set equal to the upper current limit $I_{lower}$.

The ghost conduction states are triggered by the switching of the reference slave and the desired phase offsets (see FIGS. 20 and 21). Specifically, the ghost switches to a ghost PMOS conduction state at the desired phase offset $\Phi(i)$ after the reference slave switches to a PMOS conduction state. Similarly, the ghost switches to a ghost NMOS conduction state at the desired phase offset $\Phi(i)$ after the reference slave switches to an NMOS conduction state.

As mentioned above, switching of the non-reference slaves is controlled by comparing the estimated current $I_{estimate}(i)$ for the non-reference slave (shown by solid line 86 in FIG. 23) to the ghost current $I_{ghost}(i)$ for the non-reference slave (shown phantom line 84 in FIG. 23). Specifically, if the non-reference slave is in a PMOS conduction state, the ghost is in an NMOS conduction state, and the estimated current $I_{estimate}(i)$ exceeds the ghost current $I_{ghost}(i)$, then the slave will switch to an NMOS conduction state. Similarly, if the non-reference slave is in an NMOS conduction state, the ghost is in a PMOS conduction state, and the estimated current $I_{estimate}(i)$ falls below the ghost current $I_{ghost}(i)$, then the slave will switch to an PMOS conduction state. In other words, if the slave will switch the estimated current crosses the ghost current and the two current have opposite slopes. Thus, the slave is switched to effectively track the ghost current. In addition, if the ghost is in a PMOS conduction state, the non-reference slave will switch to an NMOS conduction state if the estimated current $I_{estimate}(i)$ exceeds the ghost current $I_{ghost}(i)$ by an current offset $I_{over}$, and if the ghost is in an NMOS conduction state, the non-reference slave will switch to a PMOS conduction state if the estimated current $I_{estimate}(i)$ falls below the ghost current $I_{ghost}(i)$ by an current offset $I_{under}$. This ensures that the slave current tracks the ghost current even if the ghost current is changing rapidly.

Referring to FIGS. 24–27, in a fourth implementation, the digital control algorithm 64 calculates a "ghost" current for both the reference slave and the non-reference slaves, and both the reference slave and the non-reference slaves are controlled by comparing the estimated current $I_{estimate}(i)$ to the ghost current $I_{ghost}(i)$.

Referring to FIG. 25, the digital control algorithm 64 generates a clock signal 90 having a switching frequency approximately equal to the desired switching frequency, e.g., 1 MHz, and a duty cycle D approximately equal to the desired duty cycle, e.g., $V_{out}/V_{in}$. The duty cycle may be fixed based on nominal values of $V_{in}$ and $V_{nom}$. The clock signal 90 is used to control the ghost conduction states of each ghost. Specifically, a clock signal may be generated for each active slave, with each clock signal offset by the desired phase offset phi(i). The ghost will be in a ghost PMOS conduction state when the clock signal 90 associated with the slave is high, and in a ghost NMOS conduction state when the clock signal 90 associated with the slave is low. For example, if three slaves are active, the third ghost switches after ⅓ of the switching period after the second ghost and ⅔ of the switching period after the first ghost. at the desired phase offset phi(i) after the reference slave switches to a PMOS conduction state.

As best shown by FIGS. 25 and 26, the ghost currents are otherwise calculated in a fashion similar to the calculation of the ghost currents discussed with reference to the third implementation and FIG. 18: during the ghost PMOS conduction state the ghost current $I_{ghost}(i)$ (shown by solid line 92 in FIG. 26) is incremented by the ramp-up value $\Delta I_{up-ghost}$ each clock cycle, and during the ghost NMOS conduction state the ghost current $I_{ghost}(i)$ is decremented by the ramp-down value $\Delta I_{down-ghost}$ each clock cycle. However, if the ghost current $I_{ghost}(i)$ would exceed the upper current limit $I_{upper}$, then the ghost current is set equal to the upper current limit $I_{upper}$. Similarly, if the ghost current $I_{ghost}(i)$ would fall below the lower current limit $I_{lower}$, then the ghost current is set equal to the upper current limit $I_{lower}$.

Referring to FIGS. 24 and 27, as mentioned above, switching of the non-reference slaves is controlled by comparing the estimated current $I_{estimate}(i)$ for the non-reference slave (shown by solid line 94) to the ghost current $I_{ghost}(i)$ for the non-reference slave (shown phantom line 92). Specifically, if the non-reference slave is in a PMOS conduction state, the ghost is in an NMOS conduction state, and the estimated current $I_{estimate}(i)$ exceeds the ghost current $I_{ghost}(i)$, then the slave will switch to an NMOS conduction state. Similarly, if the non-reference slave is in an NMOS conduction state, the ghost is in a PMOS conduction state, and the estimated current $I_{estimate}(i)$ falls below the ghost current $I_{ghost}(i)$, then the slave will switch to an PMOS conduction state. In other words, if the slave will switch the estimated current crosses the ghost current and the two current have opposite slopes. Thus, the slave is switched to effectively track the ghost current.

In addition, the non-reference slave will switch to an NMOS conduction state if the estimated current $I_{estimate}(i)$ would exceed the upper current limit $I_{upper}$, or to a PMOS conduction state if the estimated current $I_{estimate}(i)$ would fall below the lower current limit $I_{lower}$. To prevent excess switching that would reduce efficiency, the ramp-up and ramp-down values $\Delta I_{up-ghost}$ and $\Delta I_{down-ghost}$ of the ghosts may be set artificially lower than the ramp-up and ramp-down values $\Delta I_{up}$ and $\Delta I_{down}$ for the estimated current, e.g., by about 20–25%. Alternately, the ghost current could be permitted to exceed or fall below the upper and lower current limits $I_{upper}$ and $I_{lower}$ by some preset margin.

What is claimed is:

1. A voltage regulator having an input terminal to be coupled to an input voltage source and an output terminal to be coupled to a load, comprising:
   a switching circuit fabricated on a first IC chip to intermittently couple the input terminal and the output terminal;
   a filter fabricated on the first IC chip to provide a generally DC output voltage at the output terminal;
   a sensor fabricated on the first IC chip to generate a first digital feedback signal representing an electrical characteristic of the voltage regulator on a first feedback line;
   a digital controller coupled to the first feedback line which receives and uses the digital feedback signal to generate the digital control signal, the digital controller configured to maintain the output voltage at the output terminal at a substantially constant level, the digital controller fabricated on a second, separate IC chip; and
   an interpreter fabricated on the first IC chip, the interpreter receiving the digital control signal and converting the digital control signal into a command to switch the switching circuit.

2. The voltage regulator of claim 1, wherein the switching circuit includes a rectifier to at least intermittently couple the output terminal to ground.

3. The voltage regulator of claim 1, further comprising a state sensor to generate a digital state signal indicating the state of the switching regulator which is received by the digital controller.

4. The voltage regulator of claim 1, wherein the first digital feedback signal indicates whether a current passing through the switching circuit exceeds a threshold current.

5. The voltage regulator of claim 4, wherein the sensor generates a plurality of digital feedback signals, each signal representing whether the current has exceeded a different threshold current.

6. The voltage regulator of claim 4, further comprising a fault protection circuit to override the digital control signal and open the switching circuit if the current passing through the switching circuit exceeds a safety limit, the safety limit being larger than the threshold current.

7. The voltage regulator of claim 7, wherein the fault protection circuit generates a second digital feedback signal which is received by the digital controller if the current exceeds the safety limit.

8. The voltage regulator of claim 4, wherein the switching circuit includes a first transistor to couple the output terminal to the input terminal and a second transistor to couple the output terminal to ground.

9. The voltage regulator of claim 8, wherein the sensor includes a first sensor to generate a first digital feedback signal on a first feedback line representing the current passing through the first transistor and a second sensor to generate a second digital feedback signal on a second feedback line representing the current passing through the second transistor.

10. The voltage regulator of claim 9, wherein the first and second feedback lines are coupled to a third feedback line, third feedback line coupled to the digital controller and carrying a third digital feedback signal, and the digital controller includes logic to determine which transistor is represented by the third digital feedback signal on the third feedback line.

11. The voltage regulator of claim 1, wherein the digital control signal generated by the digital controller includes a first control signal on a first control line and a second control signal on a second control line, and the interpreter converts the first control signal into a command to open the first transistor and close the second transistor and converts the second control signal into a second command to close the first transistor and open the second transistor.

12. The voltage regulator of claim 11, wherein the digital control signal generated by the digital controller includes a third control signal on a third control line, and the interpreter converts the third control signal into a command to open the first and second transistors.

13. The voltage regulator of claim 12, wherein the interpreter converts the third control signal into a command to open the first and second transistors if the second transistor is closed and a current passing through the switching circuit falls below zero.

14. A voltage regulator having an input terminal to be coupled to an input voltage source and an output terminal to be coupled to a load, comprising:
   a) a plurality of slaves fabricated on a plurality of first IC chips, each slave including
      i) an interpreter to receive a digital control signal and convert the digital control signal into a command;
      ii) a switching circuit to intermittently couple the input terminal and the output terminal in response to the command from the interpreter,
      iii) a filter to provide a generally DC output voltage at the output terminal;
      iv) a sensor to generate a digital feedback signal representing an electrical characteristic of the voltage regulator; and
   b) a digital controller fabricated on a second IC chip, the digital controller coupled to the feedback line from each of the slaves, the digital controller receiving and using the digital feedback signals from the slave plurality of slaves to generate a digital control signal for each slave, the digital controller configured to maintain the output voltage at the output terminal at a substantially constant level.

15. A method of operating a voltage regulator having an input terminal to be coupled to an input voltage source and an output terminal to be coupled to a load, comprising:
   receiving a digital control signal on a first IC chip and convert the digital control signal into a command;
   intermittently coupling the input terminal and the output terminal with a switching circuit located on the first IC chip in response to the command;
   filtering an output of the switching circuit to provide a generally DC output voltage at the output terminal;
   generating a digital feedback signal representing an electrical characteristic of the voltage regulator with a sensor on the first IC chip; and
   receiving and using the digital feedback signal from first IC chip in a digital controller on a second IC chip to generate the digital control signal, the digital controller configured to maintain the output voltage at the output terminal at a substantially constant level.

* * * * *